US012732264B2

(12) United States Patent
Kim et al.

(10) Patent No.: US 12,732,264 B2
(45) Date of Patent: Sep. 8, 2026

(54) APPARATUS AND METHOD FOR PROVIDING ACCESS IN NON-TERRESTRIAL NETWORK

(71) Applicant: THINKWARE CORPORATION, Seongnam-si (KR)

(72) Inventors: Daewon Kim, Seongnam-si (KR); Taekyu Han, Seongnam-si (KR); Jeoungkyu Kang, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 321 days.

(21) Appl. No.: 18/231,779

(22) Filed: Aug. 8, 2023

(65) Prior Publication Data

US 2024/0056176 A1 Feb. 15, 2024

(30) Foreign Application Priority Data

Aug. 9, 2022 (KR) ........................ 10-2022-0099593

(51) Int. Cl.
*H04B 7/185* (2006.01)
*H04W 72/12* (2023.01)
*H04W 72/23* (2023.01)

(52) U.S. Cl.
CPC ........ *H04B 7/18539* (2013.01); *H04W 72/12* (2013.01); *H04W 72/23* (2023.01)

(58) Field of Classification Search
CPC ........... H04B 7/18539; H04B 7/18513; H04W 72/12; H04W 72/23; H04W 56/001;
(Continued)

(56) References Cited

U.S. PATENT DOCUMENTS 11,917,572 B2 * 2/2024 Miao ..................... H04L 5/0091
11,985,618 B2 * 5/2024 Narasimha ........ H04W 74/0833
(Continued)

FOREIGN PATENT DOCUMENTS

WO 2021/164579 A1 8/2021
WO 2022/005263 A1 1/2022

OTHER PUBLICATIONS

Qualcomm Incorporated, "Maintenance on NR NTN", 3GPP Draft; R1-2204984, 3rd Generation Partnership Project (3GPP), Mobile Competence Centre; 650, Route Des Lucioles; F-06921 Sophia-Antipolis Cedex; France, vol. RAN WG1, No. e-Meeting; May 9, 2022-May 20, 2022 Apr. 25, 2022, XP052138289, cited in EESR dated Jan. 23, 2024 (5 pages).
(Continued)

*Primary Examiner* — John D Blanton
(74) *Attorney, Agent, or Firm* — WHDA, LLP

(57) ABSTRACT

According to embodiments, a method performed by a non-terrestrial network (NTN) device for providing a new radio (NR) access may include generating NTN configuration information, and transmitting a message comprising the generated NTN configuration information to a user equipment (UE) via an NTN payload. The NTN configuration information may include scheduling offset information. The scheduling offset information may be applied to a difference between physical downlink control channel (PDCCH) reception and physical uplink control channel (PUCCH) transmission or a difference between PDCCH reception and physical uplink shared channel (PUSCH) transmission. The scheduling offset information may be indicated by a number of slots, based on subcarrier spacing (SCS) for a frequency range (FR) 2 band of the NR.

20 Claims, 16 Drawing Sheets

(58) Field of Classification Search
CPC ............. H04W 72/0446; H04W 48/10; H04W 72/0453; H04W 72/1268; H04W 84/06; H04L 5/0053; H04L 27/26025
See application file for complete search history.

(56) References Cited

U.S. PATENT DOCUMENTS

2021/0006328 A1* 1/2021 Kim ...................... H04W 72/23
2021/0105761 A1* 4/2021 Cheng ................... H04L 5/0053
2021/0227442 A1* 7/2021 Yiu ................. H04W 36/00837
2022/0116967 A1* 4/2022 Yeo ................... H04W 72/1268
2022/0124660 A1* 4/2022 Cheng ............... H04W 56/0045
2022/0369264 A1* 11/2022 Cheng ............... H04W 56/0045
2022/0408389 A1* 12/2022 Wang ................ H04W 56/0045
2023/0092491 A1* 3/2023 Bae ....................... H04L 5/0055 370/329
2023/0164847 A1* 5/2023 Kim .................. H04W 72/0453 370/329
2023/0254794 A1* 8/2023 Park ................... H04B 7/18513 370/316
2023/0318686 A1* 10/2023 Kwak ................ H04B 7/06956 455/101
2023/0319822 A1* 10/2023 Park ...................... H04W 72/11 370/329
2023/0388952 A1* 11/2023 Khoshkholgh Dashtaki ............... H04B 7/18513
2024/0056176 A1* 2/2024 Kim ................... H04B 7/18539
2024/0098588 A1* 3/2024 Da Silva ............. H04W 36/362
2024/0172059 A1* 5/2024 Yavuz ................... H04W 76/27
2025/0007666 A1* 1/2025 Tsai .................. H04W 74/0836
2025/0048426 A1* 2/2025 Oliveira Da Costa ...................... H04W 76/14
2025/0151103 A1* 5/2025 Yi ......................... H04W 72/21
2025/0158701 A1* 5/2025 Klenner ................ H04W 48/08
2025/0159528 A1* 5/2025 Li ......................... H04W 24/10
2025/0184878 A1* 6/2025 Oliveira Da Costa ...................... H04W 48/16
2025/0203560 A1* 6/2025 Siomina ............. H04B 7/18552
2025/0253935 A1* 8/2025 Cui ................... H04W 74/0833
2025/0287461 A1* 9/2025 Rune ................. H04W 36/0061
2025/0358830 A1* 11/2025 Choi ................... H04W 72/232

OTHER PUBLICATIONS

Moderator (Thales), “FL Summary #1: Maintenance on timing relationship enhancements and UL time and frequency synchronization for NR NTN”, 3GPP Draft; R1-2205337, 3rd Generation Partnership Project (3GPP), Mobile Competence Centre; 650, Route Des Lucioles; F-06921 Sophia-Antipolis Cedex; France, vol. RAN WG1, No. e-Meeting; May 9, 2022-May 20, 2022 May 13, 2022, XP052204157, cited in EESR dated Jan. 23, 2024 (54 pages).

Extended European Search Report dated Jan. 23, 2024, issued in counterpart application No. 23190359.2. (15 pages).

* cited by examiner

APPARATUS AND METHOD FOR PROVIDING ACCESS IN NON-TERRESTRIAL NETWORK

CROSS-REFERENCE TO RELATED APPLICATION(S)

This application is based on and claims priority under 35 U.S.C. § 119 to Korean Patent Application No. 10-2022-0099593, filed on Aug. 9, 2022, in the Korean Intellectual Property Office, the disclosure of which is incorporated by reference herein in its entirety.

BACKGROUND

Technical Field

The disclosure generally relates to a non-terrestrial network (NTN), and more particularly, to an apparatus and a method for providing access in a non-terrestrial network.

Description of Related Art

To supplement a terrestrial network providing a wireless communication system, a non-terrestrial network (NTN) has been introduced. Such a non-terrestrial network may provide communication services even in an area where it is difficult to establish a ground network or in a disaster situation. Further, with the recent decrease in satellite launch costs, an efficient access network environment may be provided.

SUMMARY

In embodiments, a method performed by a non-terrestrial network (NTN) device for providing a new radio (NR) access may comprise generating NTN configuration information, and transmitting a message comprising the generated NTN configuration information to a user equipment (UE) via an NTN payload. The NTN configuration information may comprise scheduling offset information. The scheduling offset information may be applied to a difference between physical downlink control channel (PDCCH) reception and physical uplink control channel (PUCCH) transmission or a difference between PDCCH reception and physical uplink shared channel (PUSCH) transmission. The scheduling offset information may be indicated by the number of slots, based on subcarrier spacing (SCS) for a frequency range (FR) 2 band of the NR.

In embodiments, a method performed by a user equipment (UE) may comprise receiving, from a non-terrestrial network (NTN) device for providing NR access, a message including NTN configuration information, and identifying scheduling offset information from the NTN configuration information. The scheduling offset information may be applied to a difference between physical downlink control channel (PDCCH) reception and physical uplink control channel (PUCCH) transmission or a difference between PDCCH reception and physical uplink shared channel (PUSCH) transmission. The scheduling offset information may be indicated by the number of slots, based on subcarrier spacing (SCS) for a frequency range (FR) 2 band of new radio (NR).

In embodiments, a non-terrestrial network (NTN) device for providing new radio (NR) access may comprise at least one transceiver, and at least one processor operatively coupled to the at least one transceiver. The at least one processor is configured to generate NTN configuration information, and transmit a message including the generated NTN configuration information to a user equipment (UE) via an NTN payload. The NTN configuration information may comprise scheduling offset information. The scheduling offset information may be applied to a difference between physical downlink control channel (PDCCH) reception and physical uplink control channel (PUCCH) transmission or a difference between PDCCH reception and physical uplink shared channel (PUSCH) transmission. The scheduling offset information may be indicated by the number of slots, based on subcarrier spacing (SCS) for a frequency range (FR) 2 band of the NR.

In embodiments, a user equipment (UE) may comprise at least one transceiver, and at least one processor operatively coupled to the at least one transceiver. The at least one processor may be configured to receive, from a non-terrestrial network (NTN) device for providing NR access, a message including NTN configuration information, and identify scheduling offset information from the NTN configuration information. The scheduling offset information may be applied to a difference between physical downlink control channel (PDCCH) reception and physical uplink control channel (PUCCH) transmission or a difference between PDCCH reception and physical uplink shared channel (PUSCH) transmission. The scheduling offset information may be indicated by the number of slots, based on subcarrier spacing (SCS) for a frequency range (FR) 2 band of new radio (NR).

According to embodiments of the disclosure, parameters according to coverage enhancement may be provided to a terminal in a non-terrestrial network, and thus, efficient access can be supported even in an increased propagation delay and movement of satellite.

Effects obtainable from the disclosure are not limited to those described above, and other effects not mentioned herein may be clearly understood by those skilled in the art from the following description.

BRIEF DESCRIPTION OF THE DRAWINGS

The above and other aspects, features, and advantages of certain embodiments of the disclosure will be more apparent from the following description, taken in conjunction with the accompanying, in which.

DETAILED DESCRIPTION

Figure 1:
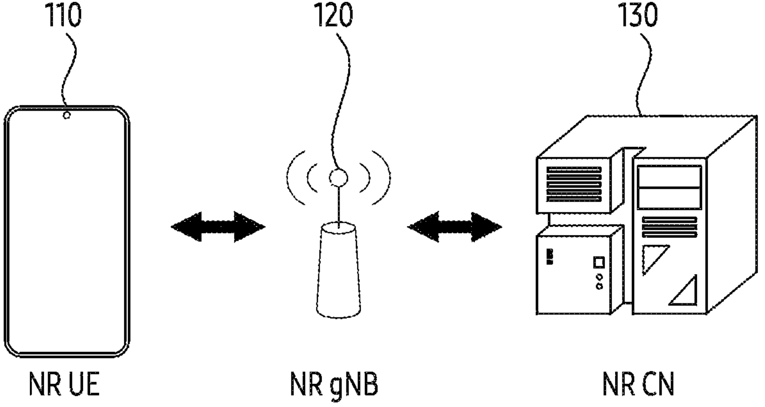
FIG. 1 illustrates an example of a wireless communication system according to embodiments.

The terms used in the disclosure are merely used to better describe a certain embodiment and may not be intended to limit the scope of other embodiments. A singular expression may include a plural expression, unless the context clearly dictates otherwise. The terms used herein, including technical and scientific terms, may have the same meanings as those commonly understood by those having ordinary knowledge in the technical field to which the disclosure pertains. Terms defined in a general dictionary amongst the terms used in the disclosure may be interpreted as having the same or similar meaning as those in the context of the related art, and they are not to be construed in an ideal or overly formal sense, unless explicitly defined in the disclosure. In some cases, even the terms defined in the disclosure may not be interpreted to exclude embodiments of the disclosure.

In various embodiments of the disclosure described below, a hardware approach will be described as an example. However, various embodiments of the disclosure may include the technology that utilizes both the hardware-based approach and the software-based approach, and therefore, the various embodiments are not intended to exclude the software-based approach.

As used in the following description, terms referring to signaling (e.g., signal, information, message, signaling, or the like), terms referring to resources (e.g., symbol, slot, subframe, radio frame, subcarrier, resource element (RE), resource block (RB), bandwidth part (BWP), occasion, or the like), terms referring to operational states (e.g., step, operation, procedure, or the like), terms referring to data (e.g., packet, user stream, information, bit, symbol, codeword, or the like), terms referring to channels, terms referring to network entities, terms referring to components of an apparatus, and so on are exemplified only for convenience of description. Therefore, the disclosure is not limited only to those terms described below, and any other terms having the same or equivalent technical meaning may be used therefor.

In the following description, the term 'physical channel' and 'signal' may be used interchangeably with data or control signals. For example, the term 'physical downlink shared channel (PDSCH)' refers to a physical channel over which data is transmitted, but PDSCH may be also used to refer to data. In other words, throughout the present disclosure, an expression "transmitting a physical channel" may be interpreted equivalently to an expression "transmitting data or a signal via a physical channel".

As used herein, up-signaling refers to a scheme of signaling transmitted from a base station to a terminal using a physical layer of downlink data channel, or from a terminal to a base station using a physical layer of uplink data channel. Higher-level signaling may be understood as radio resource control (RRC) signaling or MAC control element (CE) signaling.

Further, throughout the disclosure, an expression such as e.g., 'more than' or 'less than' may be used to determine whether a specific condition is satisfied or fulfilled, but it is merely of a description to represent an example and is not intended to exclude the meaning of 'more than or equal to' or 'less than or equal to'. A condition described as 'more than or equal to' may be replaced with 'more than', a condition described as 'less than or equal to' may be replaced with 'less than', and a condition described as 'more than or equal to and less than' may be replaced with 'more than and less than or equal to', respectively. Furthermore, hereinafter, 'A' to 'B' may mean at least one of the elements enumerated from A (inclusive of A) to B (inclusive of B).

The disclosure describes various embodiments using the terms used in some of telecommunication standards (e.g., 3GPP (3rd Generation Partnership Project), ETSI (European Telecommunications Standards Institute), xRAN (extensible radio access network), or O-RAN (open-radio access network)), but they are merely of an example for better description. Various embodiments of the disclosure may be readily adapted and applied to other communication systems.

FIG. 1 shows an example of a wireless communication system according to embodiments.

Referring to FIG. 1, it illustrates a terminal 110 and a base station 120 as part of nodes using a wireless channel in a wireless communication system. Although FIG. 1 illustrates only one base station, the wireless communication system may further include another base station that is the same as or similar to the base station 120.

The terminal 110 is a device used by a user and communicates with the base station 120 over a wireless channel. A link from the base station 120 to the terminal 110 is referred to as a downlink (DL), and another link from the terminal 110 to the base station 120 is referred to as an uplink (UL). Further, although not illustrated in FIG. 1, the terminal 110 and another terminal may communicate with each other over a wireless channel. In this context, a device-to-device link (D2D) between the terminal 110 and another terminal may be referred to as a sidelink, and such a sidelink may be used interchangeably with a PC5 interface. In some other embodiments, the terminal 110 may be operated without any user involvement. According to an embodiment, the terminal 110, which is a device that performs machine type communication (MTC), may not be carried by a user. Further, according to an embodiment, the terminal 110 may be a narrowband (NB)-internet of things (IoT) device.

In addition to the term 'terminal', the terminal 110 may be referred to as 'user equipment (UE)', 'vehicle', 'customer premises equipment (CPE)', 'mobile station', 'subscriber station', 'remote terminal', 'wireless terminal', 'electronic device', 'user device' or any other terms having a technical meaning equivalent thereto.

The base station 120 is a network infrastructure for providing radio access to the terminal 110. The base station 120 has a coverage defined based on a range capable of transmitting a signal. In addition to the term 'base station', The base station 120 may be referred to as 'access point (AP)', 'eNodeB (eNB)', '5th generation (5G) node', 'next generation nodeB (gNB)', 'wireless point', 'transmission/reception point (TRP)', or any other terms having a technical meaning equivalent thereto.

The base station 120 may communicate with a core network entity 130. For example, the core network entity 130 may include an access and management function (AMF). Further, for example, the core network entity 130 may include a user plane function (UPF).

The terminal 110 may perform beamforming with the base station 120. The terminal 110 and the base station 120 may transmit and receive radio signals in a relatively low frequency band (e.g., frequency range 1 (FR 1) of NR). In addition, the terminal 110 and the base station 120 may transmit and receive radio signals in a relatively high frequency band (e.g., FR 2 (or FR 2-1, FR 2-2, FR 2-3) or FR 3 of NR, or mmWave band (e.g., 28 GHz, 30 GHz, 38 GHz, or 60 GHz)). To improve the channel gain, the terminal 110 and the base station 120 may perform beamforming. Here, the beamforming may include transmission beamforming and reception beamforming. The terminal 110 and the base station 120 may assign directivity to a transmission signal or a reception signal. To this end, the terminal 110 and the base station 120 may select serving beams by means of a beam search or beam management procedure. After the serving beams are selected, subsequent communication may be performed via a resource QCL-related with a resource transmitting the serving beams.

If large-scale characteristics of the channel through which a symbol on a first antenna port has been transmitted could be inferred from the channel through which a symbol on a second antenna port has been transmitted, then the first antenna port and the second antenna port may be evaluated as having a QCL relationship. For example, such large-scale characteristics may include at least one of delay spread, Doppler spread, Doppler shift, average gain, average delay, or spatial receiver parameter.

Both the terminal 110 and the base station 120 may perform beamforming, but various embodiments of the disclosure are not necessarily limited thereto. In some embodiments, the terminal 110 may or may not perform the beamforming. Further, the base station 120 may or may not perform the beamforming. In other words, only one of the terminal 110 and the base station 120 may perform the beamforming, or neither the terminal 110 nor the base station 120 may perform the beamforming.

Throughout the present disclosure, a beam refers to a spatial flow of a signal on a wireless channel, and may be formed by one or more antennas (or antenna elements), which formation procedure may be referred to as beamforming. The beamforming may include at least one of analog beamforming or digital beamforming (e.g., precoding). A reference signal transmitted based on beamforming may include, for example, a demodulation-reference signal (DM-RS), a channel state information-reference signal (CSI-RS), a synchronization signal/physical broadcast channel (SS/PBCH), a sounding reference signal (SRS), and so on. In addition, an information element (IE) such as CSI-RS resource or SRS-resource may be used as a configuration for each reference signal, and such a configuration may include information related to a beam. The beam-related information may mean whether a corresponding configuration (e.g., CSI-RS resource) uses the same spatial domain filter as another configuration (e.g., another CSI-RS resource in the same CSI-RS resource set) or uses other spatial domain filter, with which reference signal it is quasi-co-located (QCLed), or which type (e.g., QCL type A, B, C, or D) it is if QCLed.

Hereinafter, to better describe the embodiments of the disclosure, a terminal may be referred to as a UE 110 and a base station may be referred to as a gNB 120.

Figure 2:
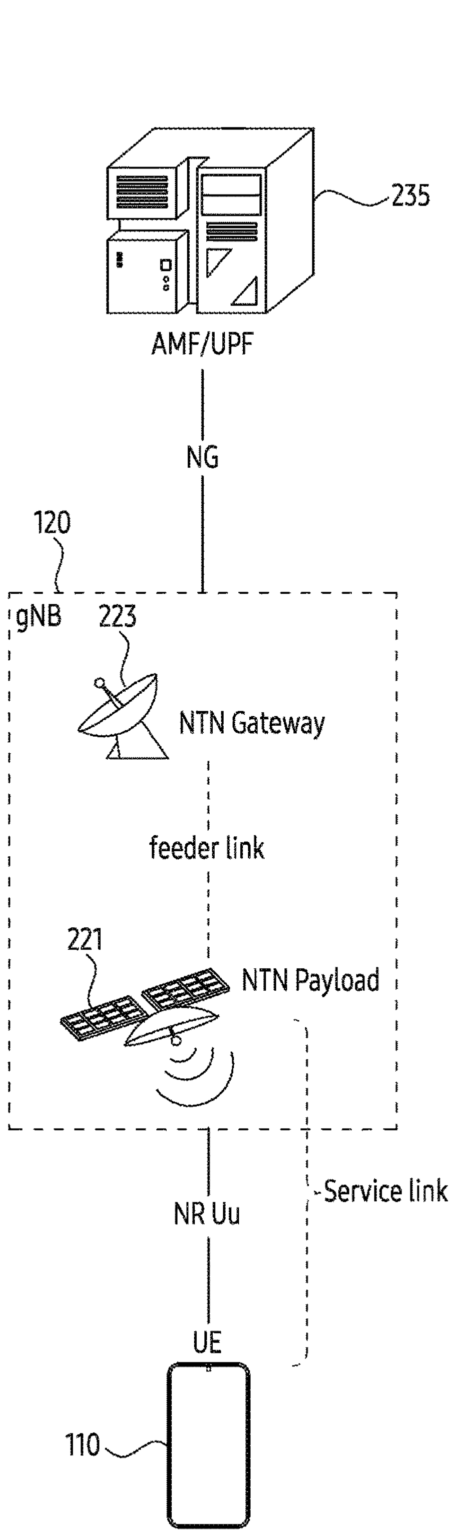
FIG. 2 illustrates an example of a non-terrestrial network (NTN) according to embodiments.

FIG. 2 illustrates an example of a non-terrestrial network (NTN) according to embodiments. The NTN refers to an NG-RAN that provides non-terrestrial NR access to a UE (e.g., the UE 110) through an NTN payload and an NTN gateway mounted on an airborne or space-borne NTN vehicle. The NG-RAN may include one or more gNBs (e.g., the gNB 120).

Referring to FIG. 2, the NTN 200 may include an NTN payload 221 and an NTN gateway 223, as the gNB 120. The NTN payload 221 is a network node mounted on a satellite or a high altitude platform station (HAPS) for providing a connection function between a service link (to be described later) and a feeder link (to be described later). The NTN gateway 223 is an earth station disposed on a surface of the earth, for providing connection to the NTN payload 221 using the feeder link. The NTN gateway 223 is a transport network layer (TNL) node. The NTN 200 may provide non-ground NR access to the UE 110. The NTN 200 may provide non-terrestrial NR access to the UE 110 through the NTN payload 221 and the NTN gateway 223. The link between the NTN payload 221 and the UE 110 may be referred to as a service link. The link between the NTN gateway 223 and the UE 110 may be referred to as a feeder link. The feeder link may correspond to a wireless link.

The NTN payload 221 may receive wireless protocol data from the UE 110 via the service link. The NTN payload 221 may transparently transfer the wireless protocol data to the NTN gateway 223 via the feeder link. Accordingly, the NTN payload 221 and the NTN gateway 223 may be viewed as a single gNB 120 from the perspective of the UE 110. The NTN payload 221 and the NTN gateway 223 may communicate with the UE 110 through a Uu interface, which is one of general wireless protocols. That is to say, the NTN payload 221 and the NTN gateway 223 may perform wireless protocol communication with the UE 110, like a single gNB 120. The NTN gateway 223 may communicate with a core network entity 235 (AMF or UPF) through an NG interface.

According to an embodiment, the NTN payload 221 and the NTN gateway 223 may use a wireless protocol stack in the control plane of FIG. 3A to be described later. Further, according to an embodiment, the NTN payload 221 and the NTN gateway 223 may use a wireless protocol stack in the user plane of FIG. 3B.

In FIG. 2, one NTN payload 221 and one NTN gateway 223 included in the gNB 120 are described, but embodiments of the disclosure are not limited thereto. For example, the gNB may include multiple NTN payloads. Further, for example, the NTN payload may be provided by multiple gNBs. That is, the implementation scenario illustrated in FIG. 2 is only of an example, and the embodiments of the disclosure are not limited thereto.

Figure 3A:
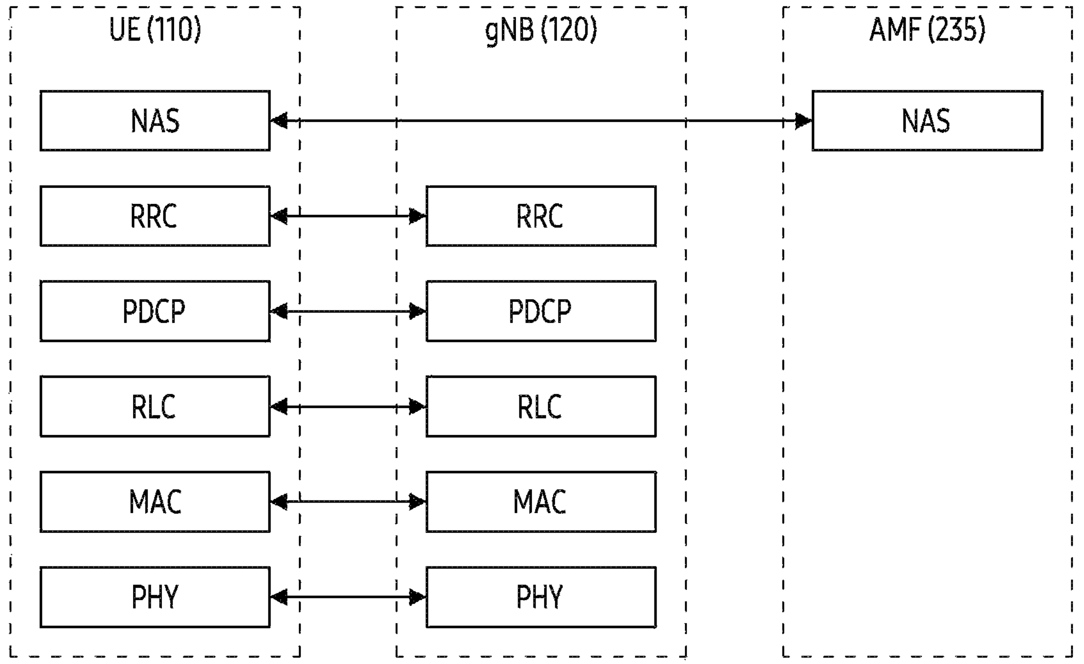
FIG. 3A illustrates an example of a control plane (C-plane) according to embodiments.

FIG. 3A illustrates an example of a control plane (C-plane) according to embodiments. The NTN payload (e.g., the NTN payload 221) and the NTN gateway (e.g., the NTN gateway 223) may function as a gNB (e.g., the gNB 120). Hereinafter, the protocol by the NTN payload and the NTN gateway may be understood as an operation of the gNB 120.

Referring to FIG. 3A, in a C-plane, the UE 110 and the AMF 235 may perform non-access stratum (NAS) signaling. In the C-plane, the UE 110 and the gNB 120 may perform communication according to a specified protocol in each of a RRC layer, a PDCP layer, a RLC layer, a MAC layer, and a PHY layer.

In NTN access, the main functions of the RRC layer may include at least some of the following functions:

- AS (access stratum) and NAS-related System Information Broadcasting;
- Paging initiated by 5GC (5G core) or NG-RAN (next generation-radio access network);
- Establishment, maintenance, and release of RRC connection between UE and NG-RAN including:
  - Addition, modification and release of carrier aggregation; and
  - Addition, modification and release of dual connectivity between NR or E-UTRA and NR.
- Security features including key management;
- Setting, configuring, maintaining and releasing of SRB (Signaling Radio Bearer) and DRB (Data Radio Bearer)
  - Moving features including:
  - Handover and context transfer;
  - UE cell selection and reselection, and cell selection and reselection control; and
  - Mobility between RATs.
- Quality of Service (QoS) management function;
- UE measurement reporting and control of reporting;
- Detection and recovery of radio link failure;
- Transmission of message from/to UE to/from NAS.

In NTN access, the main functions of the PDCP layer may include at least some of the following functions:

- Header compression and decompression (ROHC only);
- Transfer of user data;
- In-sequence delivery of upper layer PDUs;
- Out-of-sequence delivery of upper layer PDUs;
- PDCP PDU reordering for reception;
- Duplicate detection of lower layer SDUs;
- Retransmission of PDCP SDUs;
- Ciphering and Deciphering;
- Timer-based SDU discard in uplink.

In NTN access, the main functions of the RLC layer may include at least some of the following functions:

- Transfer of upper layer PDUs;
- In-sequence delivery of upper layer PDUs;
- Out-of-sequence delivery of upper layer PDUs;
- Error correction through ARQ;
- Concatenation, segmentation and reassembly of RLC SDUs;
- Re-segmentation of RLC data PDUs;
- Reordering of RLC data PDUs;
- Duplicate detection;
- Protocol error detection;
- RLC SDU discard;
- RLC re-establishment.

In NTN access, the MAC layer may be connected to several RLC layer devices configured in one terminal, and the main function of the MAC may include at least some of the following functions:

- Mapping between logical channels and transport channels;
- Multiplexing/demultiplexing of MAC SDUs;
- Scheduling information reporting;
- Error correction through HARQ;
- Priority handling between logical channels of one UE;
- Priority handling between UEs by means of dynamic scheduling;
- MBMS service identification;
- Transport format selection;
- Padding In NTN access, the physical layer may include channel coding and modulating upper layer data, making the same into an OFDM symbol to transmit to a wireless channel, or demodulating and channel decoding the OFDM symbol received via the wireless channel to transmit to the upper layer.

Figure 3B:
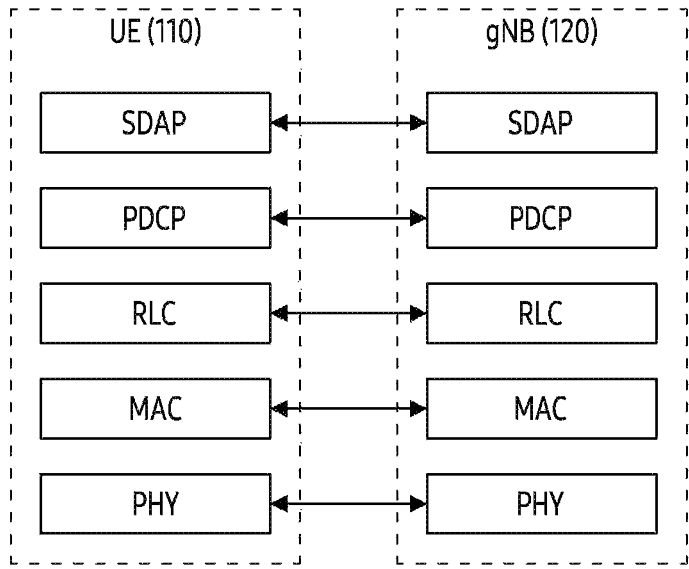
FIG. 3B illustrates an example of a user plane (U-plane) according to embodiments.

FIG. 3B illustrates an example of a user plane (U-plane) according to embodiments. The NTN payload (e.g., the NTN payload 221) and the NTN gateway (e.g., the NTN gateway 223) may function as a gNB (e.g., the gNB 120). Hereinafter, the protocol by the NTN payload and the NTN gateway may be better understood as an operation of the gNB 120.

Referring to FIG. 3B, in a U-plane, the UE 110 and the gNB 120 may perform communication according to a specified protocol in each of an SDAP layer, a PDCP layer, an RLC layer, a MAC layer, and a PHY layer. For the PDCP layer, the RLC layer, the MAC layer, and the PHY layer, except for the SDAP layer, the description of FIG. 3A may be referenced.

In NTN access, the SDAP layer may provide a QoS flow of 5GC. The single protocol entity of the SDAP may be configured for each individual PDU session, and the function of the SDAP layer may include at least some of the following functions;

- Mapping between QoS flow and data wireless bearer;
- Displaying QoS flow identifier (QFI) in both DL and UL packets.

Figure 4:
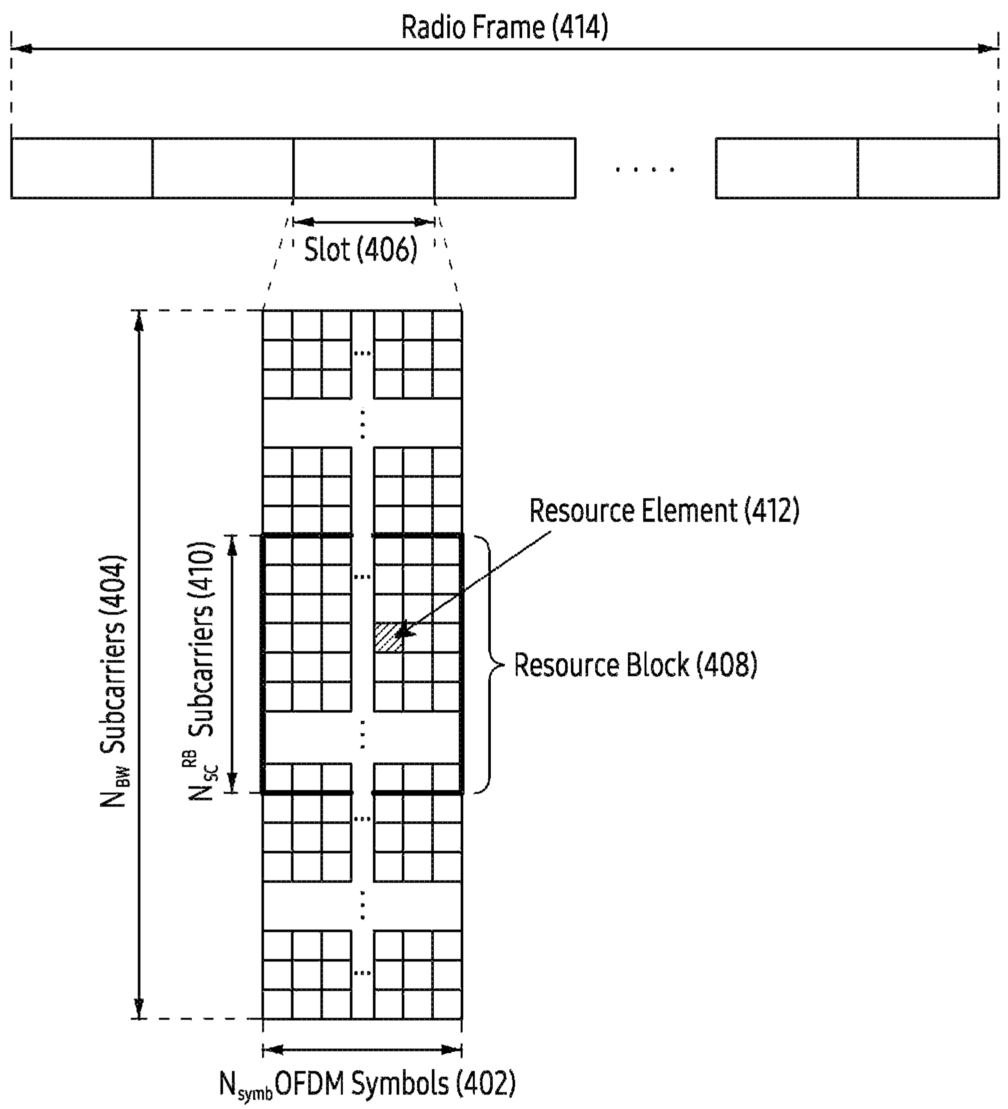
FIG. 4 illustrates an example of a resource structure of a time-frequency domain in a wireless communication system according to embodiments.

FIG. 4 illustrates an example of a resource structure in a time-frequency domain in a wireless communication system according to embodiments. FIG. 4 illustrates a basic structure of a time-frequency domain, which is a radio resource region in which data or a control channel is transmitted in a downlink or an uplink.

Referring to FIG. 4, the horizontal axis represents the time domain and the vertical axis represents the frequency domain. The minimum unit of transmission in the time domain is an OFDM symbol, wherein $N_{symb}$ OFDM symbols 402 are aggregated to form a slot 406. The length of a subframe is defined as 1.0 ms, and the length of the radio frame 414 is defined as 10 ms. The minimum unit of transmission in the frequency domain is a subcarrier, wherein the carrier bandwidth constituting a resource grid is configured of $N_{BW}$ subcarriers 404.

In the time-frequency domain, a basic unit of resource is a resource element (hereinafter, referred to as 'RE') 412, which may be represented by an OFDM symbol index and a subcarrier index. The resource block may include a plurality of resource elements. In the LTE system, a resource block (RB) (or a physical resource block (PRB)) is defined as $N_{symb}$ consecutive OFDM symbols in the time domain and $N_{SC}^{RB}$ consecutive subcarriers in the frequency domain. In the NR system, the resource block RB 408 may be defined as $N_{SC}^{RB}$ consecutive subcarriers 410 in the frequency domain. One RB 408 includes $N_{SC}^{RB}$ REs 412 in the frequency axis. In general, the minimum unit of transmission of data is RB and the number of subcarriers is $N_{SC}^{RB}=12$. The frequency domain may include common resource blocks (CRBs). A physical resource block (PRB) may be defined in a bandwidth part (BWP) on the frequency domain. The CRB and PRB numbers may be determined depending upon subcarrier spacing. The data rate may increase in proportion to the number of RBs scheduled for the terminal.

In the NR system, in case of a frequency division duplex (FDD) system operated by dividing a downlink and an uplink in frequencies, a downlink transmission bandwidth and an uplink transmission bandwidth may be different from each other. The channel bandwidth represents a radio frequency (RF) bandwidth corresponding to the system transmission bandwidth. Table 1 below shows some of the correspondences between the system transmission bandwidth, the subcarrier spacing (SCS), and the channel bandwidth defined in the NR system, in a frequency band lower than x GHz (e.g., frequency range (FR) 1 (410 MHz to 7125 MHz)). And, Table 2 below shows some of the correspondences between the transmission bandwidth, the subcarrier interval, and the channel bandwidth defined in the NR system, in a frequency band higher than y GHz (e.g., FR2 (24250 MHz-52600 MHz) or FR2-2 (52600 MHz-71000 MHz)). For example, an NR system having a 100 MHz channel bandwidth at 30 kHz subcarrier intervals may have a transmission bandwidth of 273 RBs. In the Table 1 and the Table 2 below, N/A may be a bandwidth-subcarrier combination not supported by the NR system.

TABLE 1

| Channel Bandwidth [MHz] | SCS | 5 | 10 | 20 | 50 | 80 | 100 |
|---|---|---|---|---|---|---|---|
| Transmission Bandwidth Configuration $N_{RB}$ | 15 Hz | 25 | 52 | 106 | 207 | N/A | N/A |
| | 30 kHz | 11 | 24 | 51 | 133 | 217 | 273 |
| | 60 kHz | N/A | 11 | 24 | 65 | 107 | 135 |

TABLE 2

| Channel Bandwidth [MHz] | SCS | 50 | 100 | 200 | 400 |
|---|---|---|---|---|---|
| Transmission Bandwidth Configuration $N_{RB}$ | 60 kHz | 66 | 132 | 264 | N/A |
| | 120 Hz | 32 | 66 | 132 | 264 |

Figure 5:
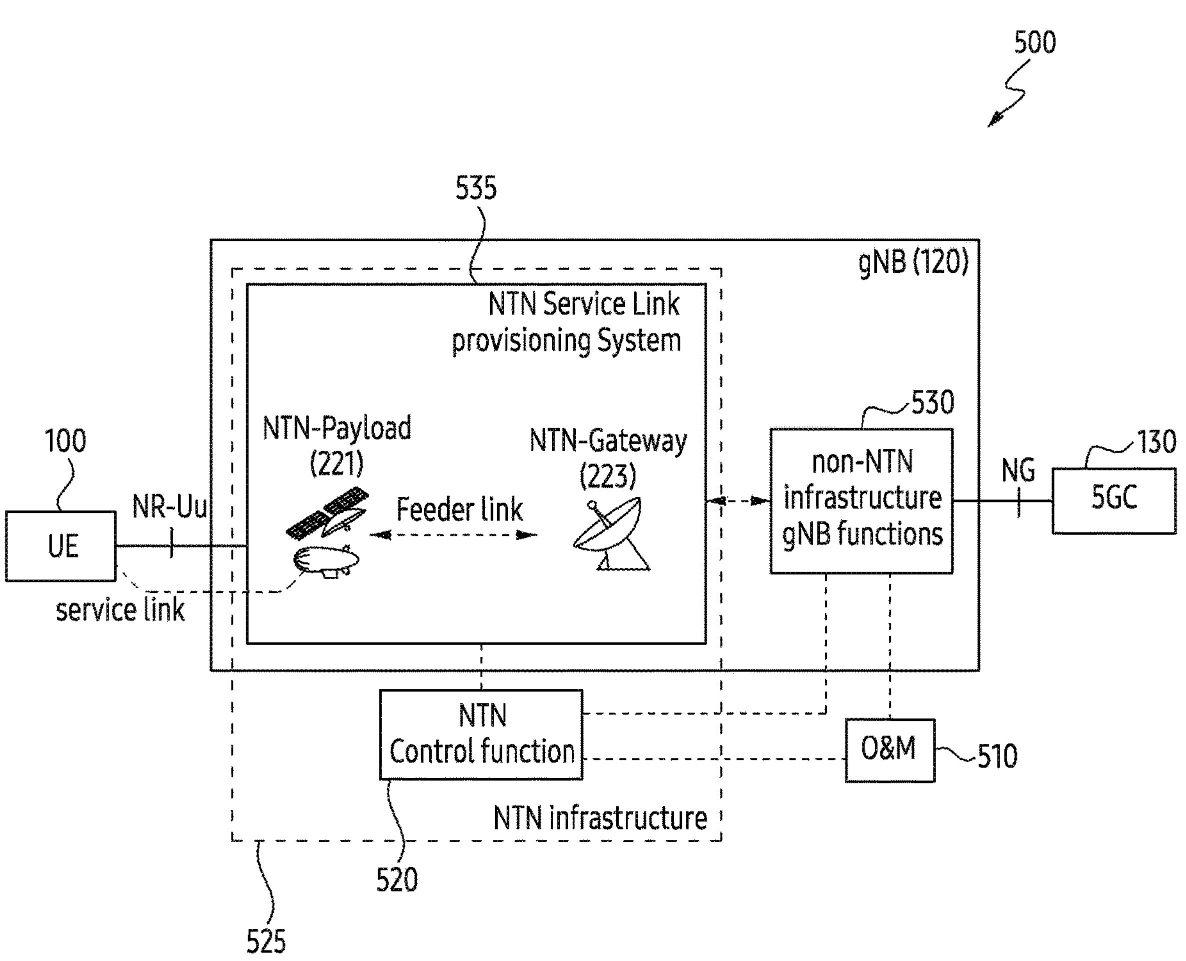
FIG. 5 illustrates an example implementation of an NTN according to an embodiment.

FIG. 5 shows an example implementation of an NTN according to an embodiment.

Referring to FIG. 5, the NTN 500 may include an NTN payload 221 and an NTN gateway 223 as the gNB 120. The NTN payload 221 may be mounted on a spacecraft (or (airborne) vehicle to provide rescue, electric power, command, remote measurement, posture control (HAPS) for a satellite, appropriate thermal environment, radiation shielding or the like.

For the operation of the NTN 500, an operation and maintenance (O&M) 510 may provide one or more parameters related to the NTN 500 to the gNB 120. The O&M 510 may control an NTN control function 520 and non-NTN infrastructure gNB functions 530.

The NTN control function 520 may control not only radio resources of the NTN infrastructure 525 (e.g., the NTN payload 221 and the NTN gateway 223), but also a spacecraft (or airborne) vehicle. In addition, the NTN control function 520 may provide control data (e.g., ephemeris information) to the non-NTN infrastructure gNB function 530.

The gNB 120 may be subdivided into a non-NTN infrastructure gNB function 530 and an NTN service link provisioning system 535. The NTN infrastructure 525 may be subdivided into an NTN control function 520 and an NTN service link provisioning system 535. The NTN service link provisioning system 535 may include one or more NTN payloads (e.g., the NTN payload 221) and NTN gateways (e.g., the NTN gateway 223). The NTN service link provisioning system 535 may map an NR-Uu radio protocol to a radio resource (e.g., beam, channel, Tx power) of the NTN infrastructure 525.

The operation and maintenance (O&M) 510 may provide at least the following NTN-related parameters to the gNB 120 for operation of the NTN.

a) Earth fixed beams: for each beam provided by a given NTN payload:
   - Cell Identifiers (NG and Uu) mapped to a beam;
   - Reference position of cell (e.g., center and range of a cell).

b) Quasi earth fixed beams: for each beam provided by a given NTN payload:
   - Cell identifiers (NG and Uu) mapped to a beam and a time window;
   - Reference position of cell/beam (e.g., center and range of a cell)
   - Time window of continuous switch-over (feeder link, service link)
   - Identifier and time window of all satellites and NTN gateways providing the service.

c) Earth moving beams: for each beam provided by a given NTN payload:
   - Mapping information on Uu cell identifier mapped to beam and fixed geographical area reported to NG, and information on motion of beam footprint on Earth;
   - Elevation for NTN payload;
   - Continuous Service Schedule of NTN-Gateways/gNBs;
   - Continuous switch-over schedule (feeder link, service link).

Figure 6:
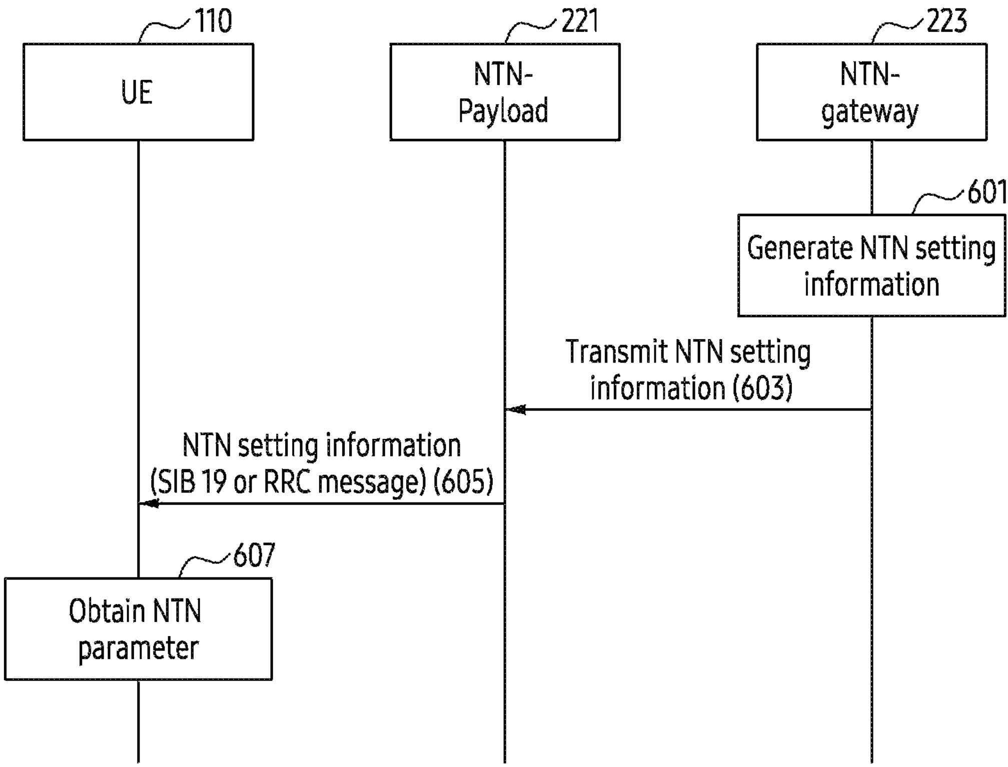
FIG. 6 illustrates an example of signaling for providing NTN configuration information to a user equipment (UE) according to an embodiment.

FIG. 6 illustrates an example of signaling for providing NTN configuration information to a user equipment (UE) according to an embodiment. The NTN configuration information may include one or more parameters related to the NTN.

Referring to FIG. 6, the NTN payload 221 and the NTN gateway 223 may function as a gNB (e.g., the gNB 120). The NTN payload 221 may transmit a signal received from the UE 110 to the NTN gateway 223 or may transmit a signal received from the NTN gateway 223 to the NTN payload 221.

In operation 601, the NTN gateway 223 may generate NTN configuration information. The NTN gateway 223 may generate NTN configuration information including one or more NTN parameters. The one or more NTN parameters may be used to provide NR access through the NTN.

In operation 603, the NTN gateway 223 may transmit the NTN configuration information to the NTN payload 221. The NTN gateway 223 may provide an access network through the NTN payload 221. The NTN gateway 223 may function as a gNB based on the NTN payload 221.

In operation 605, the NTN payload 221 may transmit NTN configuration information to the UE 110. According to an embodiment, the NTN payload 221 may generate a system information (SI) message. The NTN payload 221 may include SIB 19 including the NTN configuration information in the SI message. The NTN payload 221 may broadcast an SI message including the SIB 19. Further, according to an embodiment, the NTN payload 221 may generate an RRC message. The NTN payload 221 may transmit an RRC message including the NTN configuration information to the UE 110. For example, the RRC message may include an RRC reconfiguration message. Further, for example, the RRC message may include an RRC resume message. Furthermore, for example, the RRC message may include an RRC setup message.

In operation 607, the UE 110 may obtain one or more NTN parameters based on the NTN configuration information. The UE 110 may perform access to a cell serviced through the NTN payload 221, based on at least some of the one or more NTN parameters.

One or more NTN parameters described through the operations 601 to 607 may be defined as follows. The one or more NTN parameters may be used to make access to the NR. For example, the NTN parameters defined in the current specification are shown in the following Table 3.

TABLE 3

```
NTN-Config
The IE NTN-Config provides parameters needed for the UE to access NR
via NTN access.
NTN-Config information element
ASN1START
TAG-NTN-CONFIG-START
NTN-Config-r17 ::=        SEQUENCE {
epochTime-r17             EpochTime-r17
OPTIONAL, -- Need R
ntn-UlSyncValidityDuration-r17 ENUMERATED{ s5, s10, s15, s20, s25,
s30, s35, s40, s45, s50, s55, s60, s120, s180, s240, s900}    OPTIONAL,
-- Need R
cellSpecificKoffset-r17     INTEGER(1..1023)
OPTIONAL, -- Need R
kmac-r17             INTEGER(1..512)
OPTIONAL, -- Need R
ta-Info-r17           TA-Info-r17
OPTIONAL, -- Need R
ntn-PolarizationDL-r17     ENUMERATED {rhcp,lhcp,linear}
OPTIONAL, -- Need R
ntn-PolarizationUL-r17     ENUMERATED {rhcp,lhcp,linear}
OPTIONAL, -- Need R
ephemerisInfo-r17          EphemerisInfo-r17
OPTIONAL, -- Need R
ta-Report-r17           ENUMERATED {enabled}
OPTIONAL, -- Need R
...
}
EpochTime-r17 ::=        SEQUENCE {
sfn-r17             INTEGER(0..1023),
subFrameNR-r17            INTEGER(0..9)
}
TA-Info-r17 ::=        SEQUENCE {
ta-Common-r17          INTEGER(0..66485757),
ta-CommonDrift-r17        INTEGER(−257303..257303)
OPTIONAL, -- Need R
ta-CommonDriftVariant-r17    INTEGER(0..28949)
OPTIONAL -- Need R
}
TAG-NTN-CONFIG-STOP
-- ASN1STOP
```

'epochTime-r17' may indicate an epoch time. 'ntn-U1SyncValidityDuration-r17' may indicate an effective time of uplink synchronization. 'cellSpecificKoffset-r17' may indicate a scheduling offset. 'kmac-r17' may indicate a scheduling offset related to MAC CE. 'ta-Info-r17' may include parameters related to timing advance (TA). 'ntn-PolarizationDL-r17' may indicate a polarization mode in DL. 'ntn-PolarizationUL-r17' may indicate a polarization mode in UL. 'ephemerisInfo-r17' may include ephemeris information of a satellite. 'ta-Report-r17' may indicate whether a TA reporting is activated during random access.

Meanwhile, as demands for NTN increase, an agreement has been made that the NR standard is to additionally support various scenarios to improve NTN-based NG-RAN. For example, for the NTN, it is possible to support deployment in frequency bands of 10 GHz or more. Further, for example, it is possible to provide improved mobility and service continuity in consideration of NTN characteristics such as large propagation delay and satellite movement. However, the parameters defined in the current specification alone may not be sufficient to support the scenario according to large propagation delay or satellite movement. For example, the movement of a satellite may change a round trip time (RTT) between a base station (e.g., the gNB 120) and a terminal (e.g., the UE 110) in an access network. For a reduced RTT, access may be performed within a preset range of parameters. However, at the boundary of a NTN cell, it may be difficult for the UE 110 to access the gNB 120 based on an increased RTT. Further, for example, the UE 110 performing a handover to the NTN cell may enter an idle state if the uplink synchronization does not have sufficient effective time. The UE 110 entering the effective state may perform an RRC re-establishment (RE), which may cause a delay in the handover procedure.

In order to provide improved mobility and service continuity in increasing scenarios, the NTN gateway 223 according to embodiments of the disclosure may provide the UE 110 with at least one NTN parameter having an additional configuration range or one or more NTN parameters according to a new configuration scheme through the NTN payload 221.

Figure 7A:
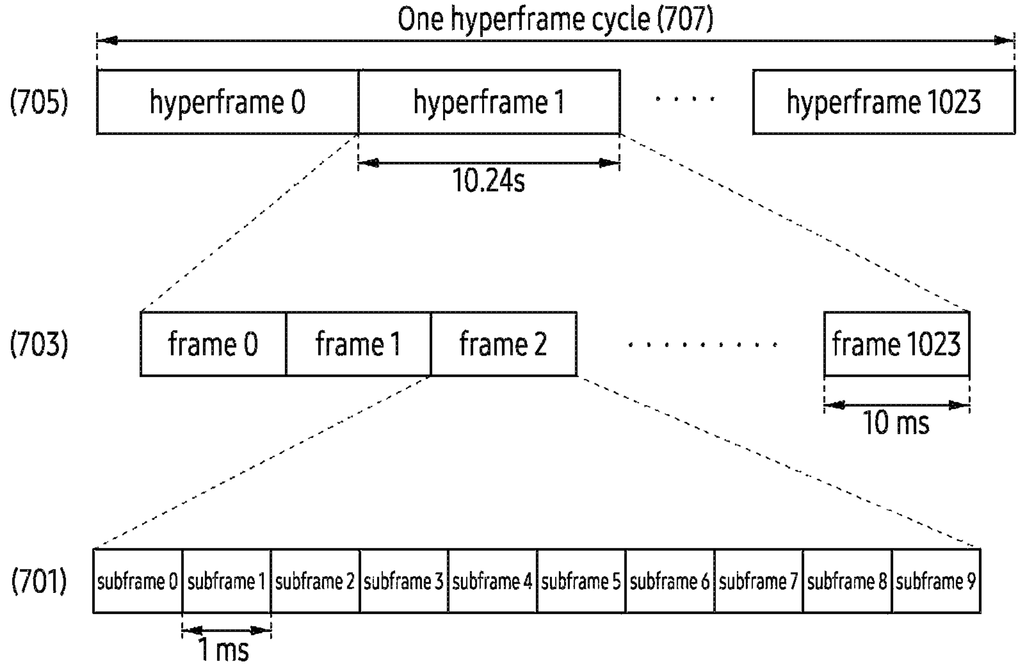
FIG. 7A illustrates an example of a hyper-frame according to an embodiment.

FIG. 7A illustrates an example of a hyper-frame according to an embodiment.

Referring to FIG. 7A, the length of a subframe 701 may be 1 ms. One radio frame 703 may include 10 subframes. The length of one radio frame 703 may be 10 ms. The radio frame 703 may be numbered as a system frame number (SFN). The number of the radio frame 703 may increase in ascending order from 0 up to 1023. Subsequently, the radio frame after the radio frame having the SFN number of 1023 may be numbered as 0 back again.

The 1024 radio frames 703 may be referred to as one hyper-frame 705. In order to support a long propagation delay between the UE 110 and the gNB 120, NTN parameters may be required to have a larger scale of numbering range. The hyper-frame 705 may be numbered as a hyper frame number (HFN). The number of the hyper-frame 705 may increase in ascending order from 0 up to 1023. Thereafter, the hyper-frame subsequent to the hyper-frame having HFN of 1023 may be numbered as 0 back again. 1024 hyper-frames 705 may be referred to as one hyper-frame cycle 707. Accordingly, the NTN parameter may be used to support a wider range of coverage and/or a coverage corresponding to a longer RTT, based on the HFN using a unit of 10.24 seconds instead of the SFN using a unit of 10 ms.

According to an embodiment, the NTN payload 221 and the NTN gateway 223 (hereinafter, referred to as "NTN base station") (e.g., the gNB 120) may transmit information indicating an epoch time supporting the HFN to the UE 110. The epoch time refers to an epoch time for auxiliary information (i.e., serving satellite ephemeris information and common TA parameters). A reference point for the epoch time of the serving satellite ephemeris information and the common TA parameters may be an uplink time synchronization reference point.

TABLE 4

```
NTN-Config
The IE NTN-Config provides parameters needed for the UE to access NR
via NTN access.
NTN-Config information element
ASN1START
TAG-NTN-CONFIG-START
NTN-Config-r17 ::=        SEQUENCE {
epochTime-r17          EpochTime-r17
OPTIONAL, -- Need R
...
}
Epoch Time-r17 ::=        SEQUENCE {
hfn-r17              INTEGER(0..1023),
sfn-r17              INTEGER(0..1023),
subFrameNR-r17            INTEGER(0..9)
}
TAG-NTN-CONFIG-STOP
-- ASN1STOP
```

The NTN base station may transmit the epoch time information including 'hfn-r17' information element (IE) to the UE 110. The NTN base station may transmit the epoch time information including 'hfn-r17' IE, 'sfn-r17' IE, and 'subframeNR-r17' IE to the UE 110. The UE 110 may identify a specific subframe based on 'hfn-r17' IE, 'sfn-r17' IE, and 'subframeNR-r17' IE. The specific subframe may be used to identify a start time of DL subframe or a reference point of UL synchronization. The maximum epoch time without the HFN is 10.24 seconds. However, considering that the effective time range of the UL synchronization is up to 900 seconds, specifying the location of a specific subframe within 10.24 seconds of range may result in an error. Furthermore, the orbital movement of a low-orbited satellite as well as a medium-orbited satellite or a GEO satellite requires a larger scale of time range, and thus, indicating of the epoch time using the HFN allows the NTN base station to provide high temporal synchronization to the UE 110.

Figure 7B:
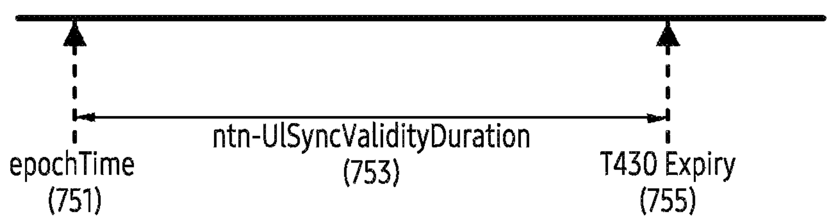
FIG. 7B illustrates an example of an UL synchronization parameter of NTN configuration information according to an embodiment.

FIG. 7B illustrates an example of a UL synchronization parameter of NTN configuration information according to an embodiment.

Referring to FIG. 7B, the NTN configuration information may include information on a valid duration period 753 of UL synchronization. The valid duration period 753 of the UL synchronization may mean a length of an effective timer for the UL synchronization. The UE 110 may receive NTN configuration information. The UE 110 may obtain information on a valid duration period of the UL synchronization from the NTN configuration information. The valid duration period of the UL synchronization refers to the maximum time duration for which auxiliary information of the UL synchronization such as common TA parameters or satellite ephemeris information is valid. As described above with reference to FIG. 7A, the UE 110 may obtain an epoch time 751 based on NTN configuration information. The UE 110 may identify that the UL synchronization is valid for the valid duration period 753 (i.e., ntn-UlsyncValdityDuration IE) of the UL synchronization from the epoch time 751, starting at the epoch time 751. When the valid period ends, a T430 timer may expire. When the T430 timer expires, the UE 110 may identify that the uplink synchronization is lost. On the other hand, for example, upon receiving an SIB 19 including NTN configuration information, the UE 110 may start or restart the T430 timer with a duration period corresponding to the valid period 753 of UL synchronization from the subframe indicated by the epoch time 751.

The effective period 753 of the UL synchronization may be determined based on at least one of a position estimation error of a serving satellite, a quantization error associated with bit allocation of ephemeris format of a serving satellite, or a common TA estimation error in a UE. In particular, as the orbit of the satellite goes higher, that is, as the altitude of an NTN payload (e.g., the NTN payload 221) becomes greater, a longer valid duration period may be required to increase the accuracy of error estimation. For example, for a GEO satellite, a length of 900 seconds may be used as a valid duration period 753 for the UL synchronization.

To indicate the valid period 753 for the UL synchronization in 4-bit, 16 candidate values may be used. These 16 candidate values may include s5, s10, s15, s20, s25, s30, s35, s40, s45, s50, s55, s60, s120, s180, s240, and s900. However, since only the valid period according to 's900' may be applied to the GEO satellite, the NTN base station may result in unnecessarily waste of the UL synchronization time due to the interval between s240 and s900. The limited information of 4-bit may be not enough to cover all the variability between UEs and the satellites located in various orbits. Accordingly, the NTN base station may more accurately indicate the valid period 753 for the UL synchronization with additional bit(s) or an additional field. According to an embodiment, the NTN base station may indicate the valid period 753 for the UL synchronization in units of minutes, within 15 minutes in 5-bit. For example, the valid period 753 for the UL synchronization may be indicated as shown in the following Table 5.

TABLE 5

```
NTN-Config
The IE NTN-Config provides parameters needed for the UE to access NR
via NTN access.
NTN-Config information element
ASN1START
TAG-NTN-CONFIG-START
NTN-Config-r17 ::=        SEQUENCE {
epochTime-r17          EpochTime-r17
OPTIONAL, -- Need R
ntn-UlSyncValidityDuration-r17 ENUMERATED{ s5, s10, s15, s20, s25,
s30, s35, s40, s45, s50, s55, s60, s120, s180, s240,
s300, s360, s420, s480, s540, s600, s660, s720, s780, s840, s900}
OPTIONAL, -- Need R
...
TAG-NTN-CONFIG-STOP
-- ASN1STOP
```

While Table 3 above shows a range of possible values up to s900, embodiments of the disclosure are not limited thereto. According to an embodiment, additional values (e.g., s960, s1020, s1200, and s1800) may be defined to utilize 5-bit to the maximum.

According to an embodiment, the NTN base station may indicate the valid period 753 for UL synchronization longer than 15 minutes, using an additional field. For example, values of the valid period 753 for UL synchronization, corresponding to a time duration longer than 15 minutes, may be defined using an additional field of 2-bit. This 2-bit is only of an example, and the number of bits for such an additional field may be modified without departing an equivalent technical scope (such as e.g., 1-bit, 3-bit, 4-bit).

TABLE 6

```
NTN-Config
The IE NTN-Config provides parameters needed for the UE to access NR
via NTN access.
NTN-Config information element
ASN1START
TAG-NTN-CONFIG-START
NTN-Config-r17 ::=        SEQUENCE {
```

TABLE 6-continued

```
epochTime-r17          EpochTime-r17
OPTIONAL, -- Need R
ntn-UlSyncValidityDuration-r17 ENUMERATED{ s5, s10, s15, s20, s25,
s30, s35, s40, s45, s50, s55, s60, s120, s180, s240, s900}   OPTIONAL,
-- Need R
ntn-UlSyncValidityDuration-ext-r17 ENUMERATED{ s1800, s3600,
s7200, s14400}
OPTIONAL, -- Need R
...
TAG-NTN-CONFIG-STOP
-- ASN1STOP
```

'ntn-UlSyncValidityDuration-ext-r17' IE may refer to an additional field to indicate other possible values (e.g., 30 minutes, 1 hour, 1 hour and 30 minutes, and 2 hours) of the valid period 753 for the UL synchronization.

Figure 8:
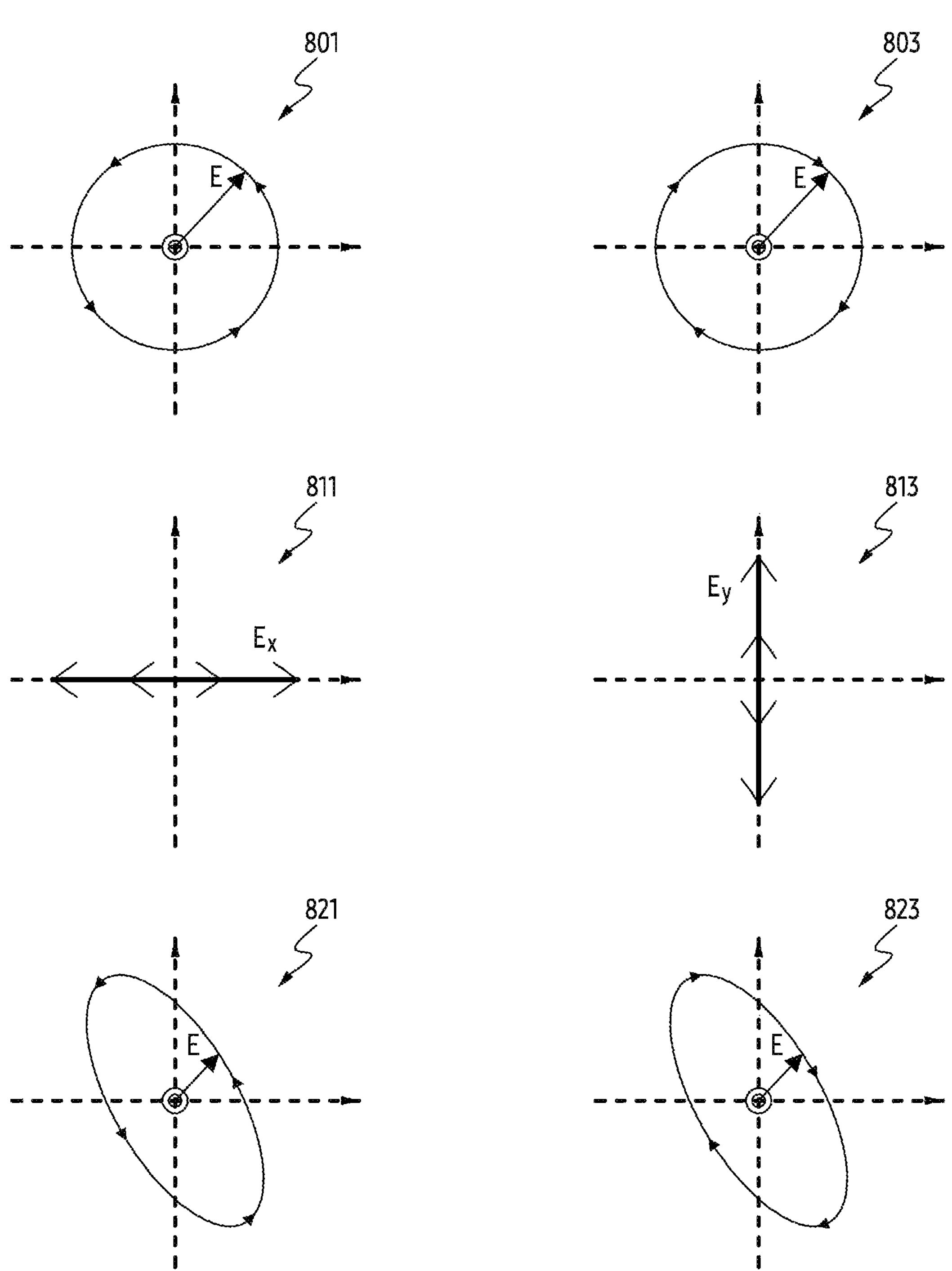
FIG. 8 illustrates an example of a polarization parameter of NTN configuration information according to an embodiment.

FIG. 8 illustrates an example of a polarization parameter of NTN configuration information according to an embodiment. In the NTN network, adjacent cells may use different polarization modes (e.g., right hand circular polarization (RHCP) or left hand circular polarization (LHCP)) to mitigate inter-cell interference. Further, UEs having different antenna types may be used. While some UEs may be equipped with linear polarization antennas, some other UEs may be equipped with circular polarization antennas. An NTN base station (e.g., the NTN payload 221 and the NTN gateway 223) may provide the polarization mode to a UE (e.g., the UE 110) to alleviate inter-cell interference.

Referring to FIG. 8, according to an embodiment, the NTN base station may transmit, to the UE 110, information to indicate circular polarization for downlink transmission or uplink transmission of the service link. A first circular polarization 801 may be RHCP. A second circular polarization 803 may be LHCP. The first circular polarization 801 and the second circular polarization 803 may be orthogonal to each other. Orthogonality of the polarization may be used to mitigate inter-cell interference.

According to an embodiment, the NTN base station may transmit, to the UE 110, information indicating linear polarization for downlink transmission or uplink transmission of the service link. The first linear polarization 811 may be a horizontal polarization. The second linear polarization 813 may be a vertical polarization. The first linear polarization 811 and the second linear polarization 813 may be orthogonal to each other. Orthogonality of the polarization may be used to mitigate inter-cell interference. However, to distinguish between linear polarizations, the NTN base station may indicate a plurality of linear polarization modes to the UE 110. For example, possible values of DL polarization information (e.g., 'ntn-PolarizationDL-r17' IE) of the NTN may include 'linear1' and 'linear2'. Further, for example, possible values of UL polarization information (e.g., 'ntn-Polarization UL-r17' IE) of the NTN may include 'linear1' and 'linear2'.

TABLE 7

```
NTN-Config
The IE NTN-Config provides parameters needed for the UE to access NR
via NTN access.
NTN-Config information element
ASN1START
TAG-NTN-CONFIG-START
NTN-Config-r17 ::=      SEQUENCE {
...
ntn-PolarizationDL-r17      ENUMERATED {rhcp,lhcp,linear1, linear2}
OPTIONAL, -- Need R
ntn-PolarizationUL-r17      ENUMERATED {rhcp,lhcp,linear1, linear2}
```

TABLE 7-continued

```
OPTIONAL, -- Need R
...
}
TAG-NTN-CONFIG-STOP
-- ASN1STOP
```

According to one embodiment, a variation of the scheme of indicating the polarization may be proposed, as opposed to Table 7. The NTN base station may provide the UE 110 with a selected type of the linear polarization or the circular polarization and the polarization information corresponding to that selected type.

TABLE 8

```
NTN-Config
The IE NTN-Config provides parameters needed for the UE to access NR
via NTN access.
NTN-Config information element
ASN1START
TAG-NTN-CONFIG-START
NTN-Config-r17 ::=      SEQUENCE {
...
ntn-PolarizationDL-r17    CHOICE{
CIRCULAR              ENUMERATED {rhcp,lhcp},
LINEAR              ENUMERATED {vertical, horizontal}
}                     OPTIONAL, -- Need R
ntn-PolarizationUL-r17   CHOICE{
CIRCULAR              ENUMERATED {rhcp,lhcp},
LINEAR              ENUMERATED {vertical, horizontal}
}                     OPTIONAL, -- Need R
}
TAG-NTN-CONFIG-STOP
-- ASN1STOP
```

The polarization information may include RHCP or LHCP when the selected type is the circular polarization (CIRCULAR). The polarization information may include vertical polarization or horizontal polarization when the selected type is the linear polarization (LINEAR). According to an embodiment, the NTN base station may transmit the NTN configuration information through a UE-specific message. In this case, the NTN base station may group UEs in the NTN cell by providing different UEs with information providing polarization orthogonal to each other. For example, the NTN base station may indicate the horizontal polarization with UL polarization information for the first UE, and may indicate the vertical polarization using UL polarization information for the second UE. Interference between the first UE and the second UE may be alleviated through the orthogonal polarization.

According to an embodiment, the NTN base station may transmit, to the UE 110, information indicating elliptical polarization for the downlink transmission or the uplink transmission of the service link. The first elliptical polarization 821 may be right hand elliptical polarization (RHEP). The second elliptical polarization 823 may be left hand elliptical polarization (LHEP). The first elliptical polarization 821 and the second elliptical polarization 823 may be orthogonal to each other. Orthogonality of the polarization may be used to mitigate intercellular interference. In the same manner as the linear polarization, the NTN base station may provide information on the elliptical polarization to the UE 110. According to an embodiment, the NTN base station may transmit the NTN configuration information including information indicating the elliptical polarization to the UE 110. The NTN base station may transmit, to the UE 110, the NTN configuration information including information indicating one of the LHEP or the RHEP of the elliptical polarization.

Figure 9A:
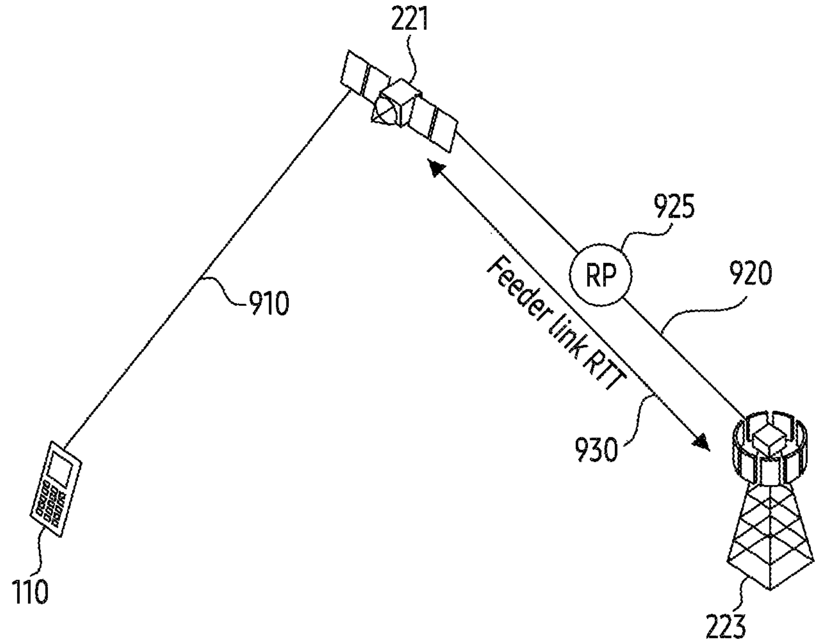
FIG. 9A illustrates an example of a scheduling offset of NTN configuration information according to an embodiment.

FIG. 9A illustrates an example of a scheduling offset of NTN configuration information according to an embodiment. The scheduling offset represents a timing relationship that is required to be modified for NTN. For example, the scheduling offset may be applied to a difference between reception of DL data and transmission of UL control information. Further, for example, the scheduling offset may be applied to a difference between reception of UL resource allocation and transmission of UL data.

Referring to FIG. 9A, the UE 110 may be connected to the NTN payload 221 through a service link 910. The NTN payload 221 may be connected to the NTN gateway 223 through a feeder link 920. The offset corresponding to the RTT between a reference point (RP) 925 and the NTN payload 221 may be referred to as a common TA. Hereinafter, $K_{offset}$ may mean a scheduling offset corresponding to the sum of the RTT and the common TA of the service link 910. Hereinafter, $K_{mac}$ may mean an offset corresponding to the RTT between the RP 925 and the gNB. In order to accept the propagation delay of the NTN, the common TA, $K_{offset}$, and $K_{mac}$ may be utilized together.

Figure 9B:
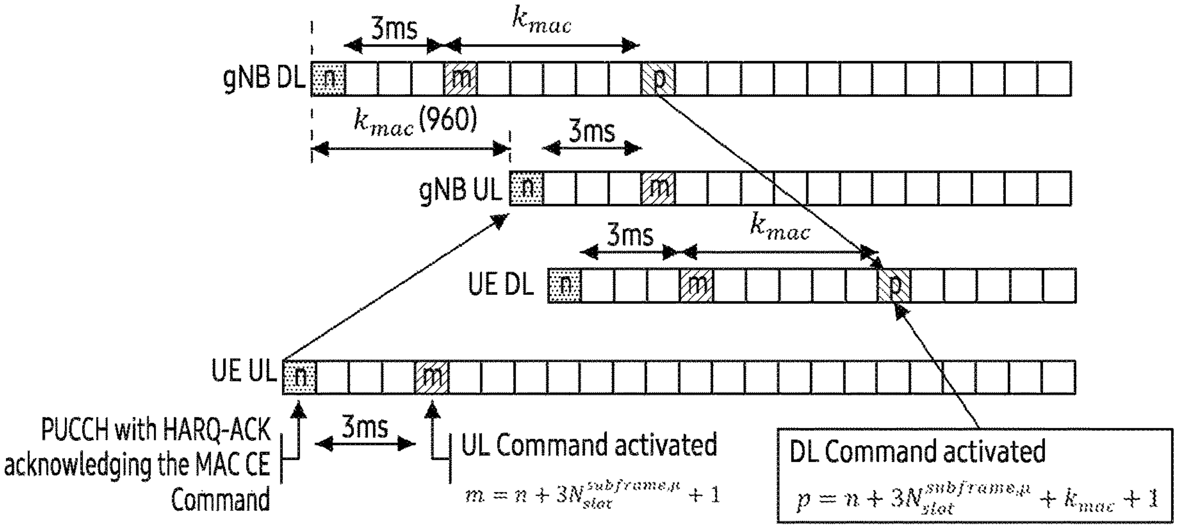
FIG. 9B illustrates an example of a scheduling offset provided by a medium access control (MAC) control element (CE) of NTN configuration information according to an embodiment.

FIG. 9B illustrates an example of a scheduling offset related to a medium access control (MAC) control element (CE) of NTN configuration information according to an embodiment. The scheduling offset is $K_{mac}$ 960, which is a scheduling offset supported by the NTN to improve MAC CE timing relationship. In other words, the $K_{mac}$ 960 is an offset for a difference between DL reception corresponding to the MAC CE and an application timing of the MAC CE. The $K_{mac}$ 960 is a scheduling offset supported by the NTN to improve the MAC CE timing relationship. When the downlink and uplink frame timings are not aligned in the gNB, the $K_{mac}$ 960 may be provided by the network. The $K_{mac}$ 960 may be used for the UE's action and assumption for the downlink configuration indicated by the MAC-CE command in the PDSCH. The $K_{mac}$ 960 may be also used for beam failure recovery for monitoring the corresponding PDCCH starting from the downlink slot "n+$K_{mac}$+4" in the corresponding RAR window after the PRACH transmission in the uplink slot n. Once the $K_{mac}$ 960 is provided to the UE 110, when the UE 110 transmits the PUCCH, together with the HARQ-ACK information in the uplink slot n, corresponding to the PDSCH carrying the MAC CE command in the downlink configuration, the UE's operation and assumption for the downlink configuration apply from the first slot following the slot $$n + 3N_{slot}^{subframe,\mu} + 2^{\mu} \cdot k_{mac},$$

where μ means the SCS configuration for the PUCCH. For example, assuming that the SCS of the PUCCH is 15 khz, activation on the command of the MAC CE may be initiated in slot p.

The NTN may provide communication even in a frequency band of 10 GHz or more for fulfilling increasing demand. Such an increased frequency band inevitably requires relatively larger subcarrier spacing (SCS). As the SCS increases in the OFDM system, the length of the slot decreases. For example, when the SCS is twice as large, the length of the slot will be twice as small. For example, when the SCS is 15 khz, the slot is 1 ms, while when the SCS is 30 khz, the slot will be 0.5 ms. The SCS according to the numerology (μ) is shown in the following Table 9.

TABLE 9

| μ | $\Delta f = 2^{\mu} \cdot 15$ [kHz] |
|---|---|
| 0 | 15 |
| 1 | 30 |
| 2 | 60 |
| 3 | 120 |
| 4 | 240 |
| 5 | 480 |
| 6 | 960 |

In other words, as the μ value increases, the slot length becomes less. Since the offsets ($K_{offset}$ and $K_{mac}$) described in FIGS. 9A and 9B are indicated in units of current slots, the physical range covered by the offsets provided via the RRC signaling decreases, when the frequency band goes higher than FR 1. For example, 'cellSpecificKoffset-r17' IE included in the NTN configuration information may indicate up to 1023 slots on the basis of 15 kiloHertz (kHz).

Depending on the orbit of the NTN payload 221, the required scheduling offset may be different. For example, in LEO, the scheduling offsets ranging from 0 to 49 ms may be supported. Further, for example, in the MEO, the scheduling offsets ranging from 93 to 395 ms may be supported. Furthermore, for example, in the GEO, the scheduling offsets ranging from 477 to 542 ms may be supported. However, as the frequency bands supported by the NTN increase, the numerology may not support 15 kHz. Recently, the Ka band (26.5-40 GHz) is under discussion as a frequency band of 10 GHz or more. The frequency range corresponding to FR 2 of NR requires a minimum SCS of 60 KHz. Due to the SCS greater than 15 kHz, it is difficult to represent values up to 542 ms only with the length indicated by 1023 slots. Therefore, a new scheme for indicating the scheduling offset is required.

According to an embodiment, the NTN base station may indicate a scheduling offset with a relatively wider range of possible values to the UE 110. Here, the scheduling offset means $K_{offset}$ of FIG. 9A. For example, the scheduling offset may be defined as shown in the Table 10 below. For example, in the Ka band, the scheduling offset may be defined on the basis of 60 kHz.

TABLE 10

```
NTN-Config
The IE NTN-Config provides parameters needed for the UE to access NR
via NTN access.
NTN-Config information element
ASN1START
TAG-NTN-CONFIG-START
NTN-Config-r17 ::=        SEQUENCE
...
cellSpecificKoffset-r17    INTEGER(1..4095)
OPTIONAL, -- Need R
...
}
TAG-NTN-CONFIG-STOP
-- ASN1STOP
```

In order to support a scheduling offset in a range of 0 to 49 ms in LEO, a scheduling offset in a range of 93 to 395 ms in MEO, and a scheduling offset in a range of 477 to 542 ms in GEO, a scheduling offset ('cellSpecificKoffset-r17' IE) having a unit slot length of 0.25 ms may have a range of 1 to 4095. In Table 10 above, 12 bits are exemplified, up to 4095, but the embodiments of the disclosure are not limited thereto. Of course, the different number of bits may be used to indicate the scheduling offset.

According to another embodiment, for the increasing frequency band, the NTN base station may transmit, to the UE 110, the NTN configuration information including a scheduling offset field specific to FR 2, instead of changing the maximum value of the scheduling offset. For example, as shown in the following Table 11, the NTN configuration information may include a scheduling offset field for FR2.

TABLE 11

```
NTN-Config
The IE NTN-Config provides parameters needed for the UE to access NR
via NTN access.
NTN-Config information element
ASN1START
TAG-NTN-CONFIG-START
NTN-Config-r17 ::=        SEQUENCE
...
cellSpecificKoffset-r17     INTEGER(1..1023)
OPTIONAL, -- Need R
cellSpecificKoffsetFR2-r18     INTEGER(1..4095)
OPTIONAL, -- Need R
...
}
TAG-NTN-CONFIG-STOP
-- ASN1STOP
```

In this case, in some embodiments, when the NTN configuration information is provided for a satellite in the frequency band corresponding to FR 2, a specific IE (e.g., 'cellSpecificKoffset-r17' IE) may be omitted to reduce the overhead of the NTN configuration information.

Similar to $K_{offset}$, the required $K_{mac}$ offset may be different depending on the orbit of the NTN payload 221. For example, in LEO, a $K_{mac}$ offset ranging from 0 to 25 ms may be supported. Further, for example, in MEO, a $K_{mac}$ offset ranging from 0 to 198 ms may be supported. Furthermore, for example, in GEO, a $K_{mac}$ offset ranging from 0 to 271 ms may be supported. Recently, as a Ka band (26.5-40 GHz) is discussed as a frequency band of 10 GHz or more, an SCS of at least 60 kHz is required as a frequency range corresponding to FR 2 of NR. Due to the SCS greater than 15 kHz, it is difficult to represent values up to 271 ms only with the length indicated by 512 slots. Therefore, a new scheme for indicating the $K_{mac}$ offset is required.

According to an embodiment, the NTN base station may indicate a $K_{mac}$ offset having a wider range of possible values to the UE 110. Here, the $K_{mac}$ offset means the $K_{offset}$ 960 of FIG. 9B. For example, the $K_{mac}$ offset may be defined as shown in the Table 12 below. For example, in the Ka band, the scheduling offset may be defined on the basis of 60 kHz.

TABLE 12

```
NTN-Config
The IE NTN-Config provides parameters needed for the UE to access NR
via NTN access.
NTN-Config information element
ASN1START
TAG-NTN-CONFIG-START
NTN-Config-r17 ::=        SEQUENCE {
...
kmac-r17             INTEGER(1..2048)
OPTIONAL, -- Need R
...
}
TAG-NTN-CONFIG-STOP
-- ASN1STOP
```

According to another embodiment, the NTN base station may transmit to the UE 110 the NTN configuration information including a $K_{mac}$ offset field specific to FR 2, instead of changing the maximum value of the $K_{mac}$ offset, for an increasing frequency band. For example, as shown in the Table 13 below, the NTN configuration information may include a $K_{mac}$ offset field for FR2.

TABLE 13

```
NTN-Config
The IE NTN-Config provides parameters needed for the UE to access NR
via NTN access.
NTN-Config information element
ASN1START
TAG-NTN-CONFIG-START
NTN-Config-r17 ::=        SEQUENCE {
...
kmac-r17             INTEGER(1..512)
OPTIONAL, -- Need R
...kmacFR2-r18             INTEGER(1..2048)
OPTIONAL, -- Need R
...
}
TAG-NTN-CONFIG-STOP
-- ASN1STOP
```

In this case, in some embodiments, when the NTN configuration information is provided for a satellite in a frequency band corresponding to FR 2, a specific IE (e.g., 'kmac-r17' IE) may be omitted to reduce the overhead of the NTN configuration information.

Figure 10:
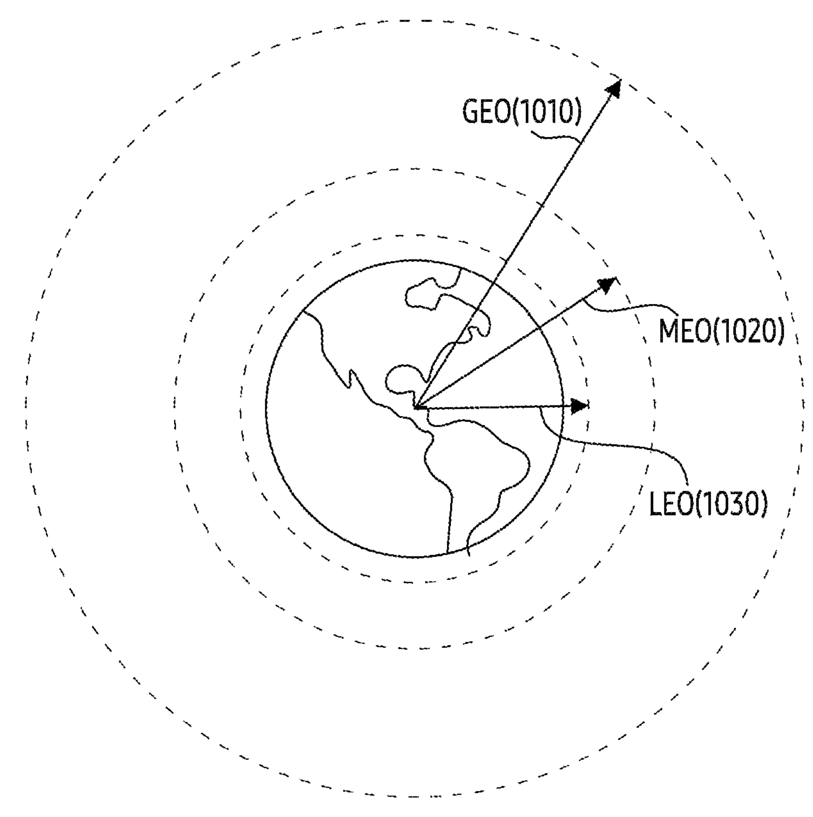
FIG. 10 illustrates examples of an NTN type according to an embodiment.

FIG. 10 illustrates examples of an NTN type according to an embodiment.

Referring to FIG. 10, a satellite refers to a space-borne vehicle wearing a bent pipe payload or a regenerative payload communication transmitter. The satellite may be disposed in a GEO 1010, a MEO 1020, or a LEO 1030. NTN types may be summarized, by way of an example, as shown in the following Table 14.

TABLE 14

| Platforms | Altitude range | Orbit | Typical beam footprint size |
|---|---|---|---|
| Low-Earth Orbit (LEO) satellite | 300-1500 km | Circular around the earth | 100-1000 km |
| Medium-Earth Orbit (MEO) satellite | 7000-25000 km | | 100-1000 km |
| Geostationary Earth Orbit (GEO) satellite | 35 786 km | notional station keeping position fixed in terms of elevation/azimuth with respect to a given earth point | 200-3500 km |
| UAS platform (including HAPS) | 8-50 km (20 km for HAPS) | | 5-200 km |
| High Elliptical Orbit (HEO) satellite | 400-50000 km | Elliptical around the earth | 200-3500 km |

Figure 11A:
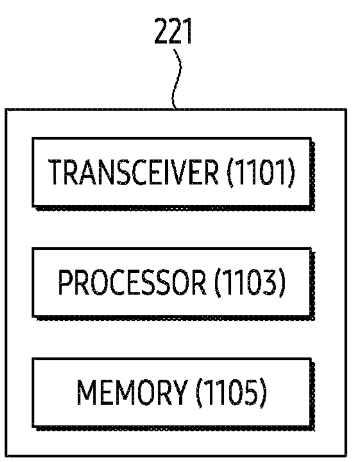
FIG. 11A illustrates components of an NTN payload according to an embodiment.

FIG. 11A illustrates components of an NTN payload according to an embodiment. The NTN payload illustrates the NTN payload 221. As used herein, the terms 'unit', 'module', 'device' or the like refer to a unit that process at least one function or operation, which may be implemented by hardware, software, or a combination of hardware and software.

Referring to FIG. 11A, the NTN payload 221 may include a transceiver 1101, a processor 1103, and a memory 1105.

The transceiver 1101 performs functions for transmitting and receiving signals over a wireless channel. For example, the transceiver 1101 up-converts a baseband signal into an RF band signal, transmits the RF band signal through an antenna, and down-converts an RF band signal received through the antenna into the baseband signal. For example, the transceiver 1101 may include a transmission filter, a reception filter, an amplifier, a mixer, an oscillator, a DAC, an ADC, or the like.

The transceiver 1101 may include a plurality of transmission/reception paths. Further, the transceiver 1101 may include an antenna unit. The transceiver 1101 may include at least one antenna array including a plurality of antenna elements. In terms of hardware, the transceiver 1101 may include a digital circuit and an analog circuit (e.g., a radio frequency integrated circuit (RFIC)). Here, the digital circuit and the analog circuit may be implemented as one package. Further, the transceiver 1101 may include a plurality of RF chains. The transceiver 1101 may perform beamforming. The transceiver 1101 may apply a beamforming weight to a signal for transmission and reception in order to assign directivity based on the configuration of the processor 1103 to the signal. According to an embodiment, the transceiver 1101 may include a radio frequency (RF) block (or RF unit).

The transceiver 1101 may transmit and receive a signal over a radio access network. For example, the transceiver 1101 may transmit a downlink signal. The downlink signal may include a synchronization signal (SS), a reference signal (RS) (e.g., a cell-specific reference signal (CRS), a demodulation (DM)-RS), system information (e.g., MIB, SIB, remaining system information (RMSI), other system information (OSI)), a configuration message, control information, downlink data, or the like. Further, for example, the transceiver 1101 may receive an uplink signal. The uplink signal may include a random access-related signal (e.g., a random access preamble (RAP) (or a message 1 (Msg1)), a message 3 (Msg3)), a reference signal (e.g., a sounding reference signal (SRS), DM-RS), a power headroom report (PHR), or the like. Although FIG. 11A illustrates only the transceiver 1101, according to another embodiment, the NTN payload 221 may include two or more RF transceivers.

The processor 1103 controls the overall operations of the NTN payload 221. The processor 1103 may be referred to as a controller or control unit. For example, the processor 1103 transmits and receives a signal through the transceiver 1101. Further, the processor 1103 records and/or reads out data in the memory 1105. The processor 1103 may perform the functions of the protocol stack required by the communication standard. Although only the processor 1103 is illustrated in FIG. 11A, according to another embodiment, the NTN payload 221 may include two or more processors. The processor 1103 may include a storage for storing instructions/codes or the instructions/codes at least temporarily residing in the processor 1103, which are instruction sets or codes stored in the memory 1105, or may be a part of circuitry constituting the processor 1103. Further, the processor 1103 may include various modules for performing communication. The processor 1103 may control the NTN payload 221 to perform operations according to embodiments.

The memory 1105 stores data such as a basic program, an application program, and configuration information for operating the NTN payload 221. The memory 1105 may be referred to as a storage unit. The memory 1105 may include a volatile memory, a non-volatile memory, or a combination of the volatile memory and the non-volatile memory. The memory 1105 provides the stored data according to a request from the processor 1103. According to an embodiment, the memory 1105 may include a memory for storing conditions, commands, or setting values related to an SRS transmission scheme.

Figure 11B:
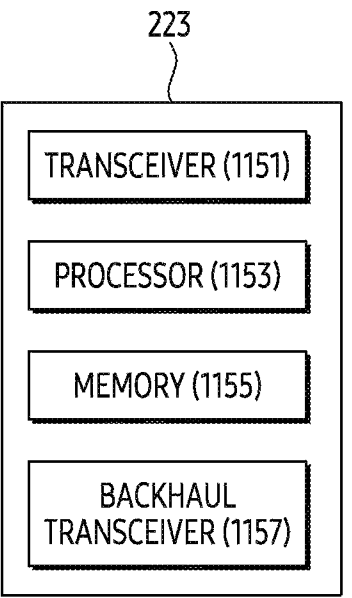
FIG. 11B illustrates components of an NTN gateway according to an embodiment.

FIG. 11B illustrates components of an NTN gateway according to an embodiment. The NTN gateway illustrates by way of an example the NTN gateway 223. As used herein, the terms " . . . unit", " . . . device," and the like may refer to a unit that processes at least one function or operation, which may be implemented in hardware or software, or a combination of hardware and software.

Referring to FIG. 11B, the NTN gateway 223 may include a transceiver 1151, a processor 1153, a memory 1155, and a backhaul transceiver 1157.

The transceiver 1151 may perform functions for transmitting and receiving signals in a wired communication environment. The transceiver 1151 may include a wired interface for controlling a direct device-to-device connection via a transmission medium (e.g., copper wire or optical fiber). For example, the transceiver 1151 may transmit an electrical signal to another device through a copper wire or may perform conversion between the electrical signal and the optical signal. The NTN gateway 223 may communicate with the NTN payload 221 via the transceiver 1151. The NTN gateway 223 may be connected to a core network or a distributed CU via the transceiver 1151.

The transceiver 1151 may perform functions for transmitting and receiving signals in a wireless communication environment. For example, the transceiver 1151 may perform a conversion function between a baseband signal and a bit string according to the physical layer specification of the system. For example, upon data transmission, the transceiver 1151 generates complex-valued symbols by encoding and modulating a transmission bit string. Further, upon data reception, the transceiver 1151 restores the received bit string by demodulating and decoding the baseband signal. Further, the transceiver 1151 may include a plurality of transmission/reception paths. Furthermore, according to an embodiment, the transceiver 1151 may be connected to a core network or may be connected to other nodes (e.g., an integrated access backhaul (IAB)).

The transceiver 1151 is configured to transmit and receive a signal as described above. Accordingly, all or a part of the transceiver 1151 may be referred to as 'communicator', 'transmitter', 'receiver', or 'transceiver'. Further, throughout the following description, transmission and reception performed through a wireless channel are used as a meaning including performing the above-described processing by the transceiver 1151.

The processor 1153 controls the overall operations of the NTN gateway 223. The processor 1153 may be referred to as a control unit or controller. For example, the processor 1153 transmits and receives a signal through the transceiver 1151 (or via a backhaul transceiver 1157). The processor 1153 records and reads out data in the memory 1155. The processor 1153 may perform functions of a protocol stack required by the communication standard. Although only the processor 1153 is illustrated in FIG. 11B, according to another embodiment, the NTN gateway 223 may include two or more processors.

The memory 1155 stores data such as a basic program, an application program, and configuration information for operating the NTN gateway 223. The memory 1155 may be referred to as a storage unit. The memory 1155 may include a volatile memory, a non-volatile memory, or a combination of the volatile memory and the non-volatile memory. Further, the memory 1155 provides the stored data according to the request of the processor 1153.

The NTN gateway 223 may further include a backhaul transceiver 1157 to be connected to a core network or another base station. The backhaul transceiver 1157 provides an interface for communicating with other nodes in the network. That is, the backhaul transceiver 1157 converts a bit string transmitted from a base station to another node, for example, another access node, another base station, an upper node, a core network, etc., into a physical signal, and converts the physical signal received from the other node into the bit string.

Figure 12:
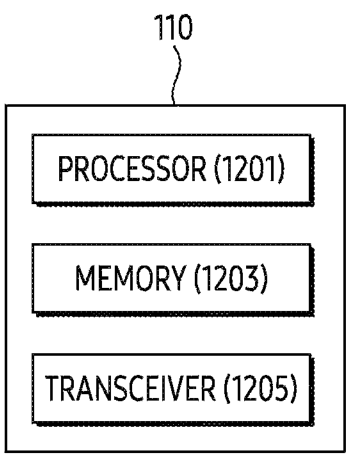
FIG. 12 illustrates components of a terminal according to an embodiment.

FIG. 12 illustrates components of a terminal according to an embodiment. The terminal illustrate by way of an example a UE 110. The UE 110 may access a gNB (e.g., the gNB 120) that provides NR access through the NTN.

Referring to FIG. 12, the UE 110 may include at least one processor 1201, at least one memory 1203, and at least one transceiver 1205. Hereinafter, components are described in the singular, but the present disclosure does not exclude the implementation with a plurality of components or sub-components.

The processor 1201 controls the overall operations of the UE 110. For example, the processor 1201 records and reads out data in the memory 1203. For example, the processor 1201 transmits and receives a signal through the transceiver 1205. FIG. 12 illustrates one processor, but embodiments of the disclosure are not limited thereto. The UE 110 may include at least one processor to perform the embodiments of the disclosure. The processor 1201 may be referred to as a control unit or a control means. According to embodiments, the processor 1201 may control the UE 110 to perform at least one of operations or methods according to embodiments of the disclosure.

The memory 1203 may store data such as a basic program, an application program, and configuration information for operating the UE 110. The memory 1203 may store various data used by at least one component (e.g., the transceiver 1205 or the processor 1201). The data may include, for example, software and input data or output data for a command related thereto. The memory 1203 may include a volatile memory, a non-volatile memory, or a combination of the volatile memory and the non-volatile memory. The memory 1203 may provide the stored data according to the request of the processor 1201.

The transceiver 1205 performs functions for transmitting and receiving signals over a wireless channel. For example, the transceiver 1205 performs a conversion function between a baseband signal and a bit string according to the physical layer standard of the system. For example, upon data transmission, the transceiver 1205 generates complex symbols by encoding and modulating a transmit bit string. Further, upon data reception, the transceiver 1205 restores a receive bit string by demodulating and decoding the baseband signal. Further, the transceiver 1205 up-converts the baseband signal into a radio frequency (RF) band signal, transmits the RF band signal via an antenna, and down-converts the RF band signal received via the antenna into the baseband signal.

To this end, the transceiver 1205 may include a transmission filter, a reception filter, an amplifier, a mixer, an oscillator, a digital-to-analog converter (DAC), an analog-to-digital converter (ADC), or the like. Further, the transceiver 1205 may include a plurality of transmission/reception paths. Furthermore, the transceiver 1205 may include at least one antenna array including a plurality of antenna elements. In terms of hardware, the transceiver 1205 may be configured of a digital unit and an analog unit, wherein the analog unit may be configured of a plurality of sub-units according to operating power, operating frequency, or the like.

The transceiver 1205 is configured to transmit and receive a signal as described above. Accordingly, the transceiver 1205 may be referred to as 'transmitter', 'receiver', or 'transceiver'. Further, in the following description, transmission and reception performed via a wireless channel, a backhaul network, an optical cable, Ethernet, or other wired paths are used as a meaning including that the above-described processing is performed by the transceiver 1205. According to an embodiment, the transceiver 1205 may provide an interface for communicating with other nodes in the network. That is, the transceiver 1205 may convert a bit string transmitted from the UE 110 to another node, for example, another access node, another base station, an upper node, a core network, or the like, into a physical signal, and may convert the physical signal received from the other node into the bit string.

In embodiments, a method performed by a non-terrestrial network (NTN) device for providing a new radio (NR) access may comprise generating NTN configuration information, and transmitting a message comprising the generated NTN configuration information to a user equipment (UE) via an NTN payload. The NTN configuration information may comprise scheduling offset information. The scheduling offset information may be applied to a difference between physical downlink control channel (PDCCH) reception and physical uplink control channel (PUCCH) transmission or a difference between PDCCH reception and physical uplink shared channel (PUSCH) transmission. The scheduling offset information may be indicated by the number of slots, based on subcarrier spacing (SCS) for a frequency range (FR) 2 band of the NR.

According to an embodiment, the NTN configuration information may further comprise medium access control (MAC) control element (CE) offset information. The MAC CE offset information may be applied to a difference between MAC CE reception and MAC CE activation timing. The MAC CE offset information may be indicated by the number of slots, based on the SCS.

According to an embodiment, the SCS may be 60 kilohertz (kHz). The message may comprise a system information (SI) message including a system information block (SIB) 19, an RRC reconfiguration message, an RRC setup message, or an RRC resume message.

According to an embodiment, the NTN configuration information may comprise information for an epoch time and information for an effective time for uplink (UL) synchronization. The information for the effective time for the UL synchronization may indicate one of a plurality of possible values. At least one of the plurality of possible values may have a value greater than 900 seconds.

According to an embodiment, the information for the epoch time may be indicated based on a hyper frame number (HFN), a system frame number (SFN), and a subframe number.

In embodiments, a method performed by a user equipment (UE) may comprise receiving, from a non-terrestrial network (NTN) device for providing NR access, a message including NTN configuration information, and identifying scheduling offset information from the NTN configuration information. The scheduling offset information may be applied to a difference between physical downlink control channel (PDCCH) reception and physical uplink control channel (PUCCH) transmission or a difference between PDCCH reception and physical uplink shared channel (PUSCH) transmission. The scheduling offset information may be indicated by the number of slots, based on subcarrier spacing (SCS) for a frequency range (FR) 2 band of new radio (NR).

According to an embodiment, the NTN configuration information may further comprise medium access control (MAC) control element (CE) offset information. The MAC CE offset information may be applied to a difference between MAC CE reception and a MAC CE activation timing. The MAC CE offset information may be indicated by the number of slots, based on the SCS.

According to an embodiment, the SCS may be 60 kilohertz (kHz). The message may comprise a system information (SI) message including a system information block (SIB) 19, an RRC reconfiguration message, an RRC setup message, or an RRC resume message.

According to an embodiment, the NTN configuration information may comprise information for an epoch time and information for an effective time for uplink (UL) synchronization. The information for the effective time for the UL synchronization indicates one of a plurality of possible values. At least one of the plurality of possible values may a value greater than 900 seconds.

According to an embodiment, the information for the epoch time may be indicated based on a hyper frame number (HFN), a system frame number (SFN), and a subframe number.

In embodiments, a non-terrestrial network (NTN) device for providing new radio (NR) access may comprise at least one transceiver, and at least one processor operatively coupled to the at least one transceiver. The at least one processor may be configured to generate NTN configuration information, and transmit a message including the generated NTN configuration information to a user equipment (UE) via an NTN payload. The NTN configuration information may include scheduling offset information. The scheduling offset information may be applied to a difference between physical downlink control channel (PDCCH) reception and physical uplink control channel (PUCCH) transmission or a difference between PDCCH reception and physical uplink shared channel (PUSCH) transmission. The scheduling offset information may be indicated by the number of slots, based on subcarrier spacing (SCS) for a frequency range (FR) 2 band of the NR.

According to an embodiment, the NTN configuration information may further comprise medium access control (MAC) control element (CE) offset information. The MAC CE offset information may be applied to a difference between MAC CE reception and MAC CE activation timing. The MAC CE offset information may be indicated by the number of slots, based on the SCS.

According to an embodiment, the SCS may be 60 kilohertz (kHz). The message may comprise a system information (SI) message including a system information block (SIB) 19, an RRC reconfiguration message, an RRC setup message, or an RRC resume message.

According to an embodiment, the NTN configuration information may comprise information for an epoch time and information for an effective time for uplink (UL) synchronization. The information for the effective time for the UL synchronization may indicate one of a plurality of possible values. At least one of the plurality of possible values may have a value greater than 900 seconds.

According to an embodiment, the information for the epoch time may be indicated based on a hyper frame number (HFN), a system frame number (SFN), and a subframe number.

In embodiments, a user equipment (UE) may comprise at least one transceiver, and at least one processor operatively coupled to the at least one transceiver. The at least one processor may be configured to receive, from a non-terrestrial network (NTN) device for providing NR access, a message including NTN configuration information, and identify scheduling offset information from the NTN configuration information. The scheduling offset information may be applied to a difference between physical downlink control channel (PDCCH) reception and physical uplink control channel (PUCCH) transmission or a difference between PDCCH reception and physical uplink shared channel (PUSCH) transmission. The scheduling offset information may be indicated by the number of slots, based on subcarrier spacing (SCS) for a frequency range (FR) 2 band of new radio (NR).

According to an embodiment, the NTN configuration information may further comprise medium access control (MAC) control element (CE) offset information. The MAC CE offset information may be applied to a difference between MAC CE reception and MAC CE activation timing (time point). The MAC CE offset information may be indicated by the number of slots, based on the SCS.

According to an embodiment, the SCS may be 60 kilohertz (kHz). The message may comprise a system information (SI) message including a system information block (SIB) 19, an RRC reconfiguration message, an RRC setup message, or an RRC resume message.

According to an embodiment, the NTN configuration information may comprise information for an epoch time and information for an effective time for uplink (UL) synchronization. The information for the effective time for the UL synchronization may indicate one of a plurality of possible values. At least one of the plurality of possible values may have a value greater than 900 seconds.

According to an embodiment, the information for the epoch time may be indicated based on a hyper frame number (HFN), a system frame number (SFN), and a subframe number.

The methods and/or apparatus according to the embodiments described in the claims or the specification of the disclosure may be implemented in the form of hardware, software, or a combination of hardware and software.

When implemented by software, a computer-readable storage medium storing one or more programs (software modules) may be provided. The one or more programs stored in a computer-readable storage medium may be configured for execution by one or more processors in an electronic device. The one or more programs may include instructions that cause the electronic device to perform methods according to any of the embodiments described in the claims or the specification of the disclosure.

Such a program (software module or software) may be stored in a random access memory, a non-volatile memory including a flash memory, a read only memory (ROM), an electrically erasable programmable read only memory (EEPROM), a magnetic disc storage device, and a compact disc-ROM (CD-ROM), digital versatile discs (DVDs), other types of optical storage devices, a magnetic cassette or the like. Alternatively, it may be stored in a memory configured by a combination of some or all of them. Further, a plurality of respective constituent memories may be included therein.

Furthermore, the program may be stored in an attachable storage device that is accessible via any communication network such as e.g., Internet, Intranet, a local area network (LAN), a wide area network (WAN) or a storage area network (SAN), or a communication network configured by a combination of these networks. Such a storage device may make access to a device performing the embodiments of the disclosure through an external port. Further, a separate storage device on the communication network may access a device performing the embodiments of the disclosure.

In the above-described specific embodiments of the disclosure, the components included in the disclosure are expressed in a singular or plural form depending upon the specific embodiment presented. However, the singular form or plural form may be selected as appropriate to the presented situation for the convenience of description, and the disclosure is not limited to the singular form or the plural form thereof. Further, either a component expressed in the plural may be configured as a single element, or a component expressed in the singular may be configured as a plurality of elements.

While specific embodiments have been described in the detailed description of the present disclosure, it will be apparently understood by those skilled in the art that various modifications in form and details may be made without departing from the scope of the disclosure.

What is claimed is:

1. A method performed by a non-terrestrial network (NTN) device for providing a new radio (NR) access, comprising:

determining whether a serving cell is associated with a frequency range (FR) 2 of NR or not;

in accordance with a determination that the serving cell is associated with the FR2, determining a reference subcarrier spacing (SCS) used for the FR 2 of NR as 60 kHz to determine values of elements in NTN configuration information;

generating the NTN configuration information based on the reference SCS being 60 kHz; and transmitting a message comprising the generated NTN configuration information to a user equipment (UE) via an NTN payload, wherein the NTN configuration information comprises:

polarization information for downlink transmission on service link between a satellite and the UE, polarization information for uplink transmission on the service link between the satellite and the UE, ephemeris information of the satellite, and scheduling offset information used for a timing relationship modified for NTN, wherein a value of the scheduling offset information is applied to a difference between physical downlink control channel (PDCCH) reception and physical uplink control channel (PUCCH) transmission or a difference between PDCCH reception and physical uplink shared channel (PUSCH) transmission, and wherein the value of the scheduling offset information is indicated by a number of slots, in units of the reference SCS being 60kHz.

2. The method of claim 1, wherein the NTN configuration information further comprises medium access control (MAC) control element (CE) offset information, wherein a value of the MAC CE offset information is applied to a difference between MAC CE reception and MAC CE activation timing, and wherein the value of the MAC CE offset information is indicated by a number of slots, in units of the reference SCS being 60 KHz.

3. The method of claim 1, wherein the message comprises a system information (SI) message including a system information block (SIB) 19.

4. The method of claim 1, wherein the NTN configuration information includes information of a validity duration for uplink (UL) synchronization, wherein the information of the validity duration for the UL synchronization indicates one of a plurality of possible values, and wherein at least one of the plurality of possible values has a value greater than 900 seconds.

5. The method of claim 1, further comprising:

in accordance with a determination that the serving cell of the UE is not associated with the FR2, determining another reference SCS used for FR 1 of NR as 15 kHz to determine values of elements in another NTN configuration information; and generating the other NTN configuration information based on the other reference SCS.

6. A method performed by a user equipment (UE), comprising:

receiving, from a non-terrestrial network (NTN) device for providing NR access, a message including NTN configuration information, wherein the NTN configuration information comprises:

polarization information for downlink transmission on service link between a satellite and the UE, polarization information for uplink transmission on the service link between the satellite and the UE, ephemeris information of the satellite, and scheduling offset information used for a timing relationship modified for NTN;

based on identifying that a serving cell of the UE is associated with a frequency range (FR) 2 band of NR, determining a reference subcarrier spacing (SCS) used for the FR 2 of NR as 60 kHz; and identifying the scheduling offset information from the NTN configuration information in accordance with the reference SCS being 60 kHz, wherein a value of the scheduling offset information is applied to a difference between physical downlink control channel (PDCCH) reception and physical uplink control channel (PUCCH) transmission or a difference between PDCCH reception and physical uplink shared channel (PUSCH) transmission, and wherein the value of the scheduling offset information is indicated by a number of slots, in units of the reference SCS being 60 kHz.

7. The method of claim 6, wherein the NTN configuration information further comprises medium access control (MAC) control element (CE) offset information, wherein a value of the MAC CE offset information is applied to a difference between MAC CE reception and a MAC CE activation timing, and wherein the value of the MAC CE offset information is indicated by a number of slots, in units of the reference SCS being 60 kHz.

8. The method of claim 6, wherein the message comprises a system information (SI) message including a system information block (SIB) 19.

9. The method of claim 6, wherein the NTN configuration information includes information of a validity duration for uplink (UL) synchronization, wherein the information of the validity duration for the UL synchronization indicates one of a plurality of possible values, and wherein at least one of the plurality of possible values has a value greater than 900 seconds.

10. The method of claim 6, further comprising:

based on identifying that the serving cell of the UE is not associated with the FR2, determining another reference SCS used for FR 1 of NR as 15 kHz to determine values of elements in another NTN configuration information.

11. A non-terrestrial network (NTN) device for providing new radio (NR) access, comprising:

at least one transceiver; and at least one processor operatively coupled to the at least one transceiver, wherein the at least one processor is configured to:

determine whether a serving cell is associated with a frequency range (FR) 2 of NR or not;

in accordance with a determination that the serving cell is associated with the FR2, determine a reference subcarrier spacing (SCS) used for the FR 2 of NR as 60 kHz to determine values of elements in NTN configuration information;

generate the NTN configuration information based on the reference SCS being 60kHz; and transmit a message including the generated NTN configuration information to a user equipment (UE) via an NTN payload, wherein the NTN configuration information comprises:

polarization information for downlink transmission on service link between a satellite and the UE, polarization information for uplink transmission on the service link between the satellite and the UE, ephemeris information of the satellite, and scheduling offset information used for a timing relationship modified for NTN, wherein a value of the scheduling offset information is applied to a difference between physical downlink control channel (PDCCH) reception and physical uplink control channel (PUCCH) transmission or a difference between PDCCH reception and physical uplink shared channel (PUSCH) transmission, and wherein the value of the scheduling offset information is indicated by a number of slots, in units of the reference SCS being 60 kHz.

12. The NTN device of claim 11, wherein the NTN configuration information further comprises medium access control (MAC) control element (CE) offset information, wherein a value of the MAC CE offset information is applied to a difference between MAC CE reception and MAC CE activation timing, and wherein the value of the MAC CE offset information is indicated by a number of slots, in units of the reference SCS being 60 kHz.

13. The NTN device of claim 11, wherein the message comprises a system information (SI) message including a system information block (SIB) 19.

14. The NTN device of claim 11, wherein the NTN configuration information includes information of a validity duration for uplink (UL) synchronization, wherein the information of the validity duration for the UL synchronization indicates one of a plurality of possible values, and wherein at least one of the plurality of possible values has a value greater than 900 seconds.

15. The NTN device of claim 11, wherein the at least one processor is configured to:

in accordance with a determination that the serving cell of the UE is not associated with the FR2, determine another reference SCS used for FR 1 of NR as 15 kHz to determine values of elements in another NTN configuration information, and generate the other NTN configuration information based on the other reference SCS.

16. A user equipment (UE), comprising:

at least one transceiver; and at least one processor operatively coupled to the at least one transceiver, wherein the at least one processor is configured to:

receive, from a non-terrestrial network (NTN) device for providing NR access, a message including NTN configuration information, wherein the NTN configuration information comprises:

polarization information for downlink transmission on service link between a satellite and the UE, polarization information for uplink transmission on the service link between the satellite and the UE, ephemeris information of the satellite, and scheduling offset information used for a timing relationship modified for NTN;

based on identifying that a serving cell of the UE is associated with a frequency range (FR) 2 band of NR, determine a reference subcarrier spacing (SCS) used for the FR 2 of NR as 60 kHz; and identify the scheduling offset information from the NTN configuration information in accordance with the reference SCS being 60 kHz, wherein a value of the scheduling offset information is applied to a difference between physical downlink control channel (PDCCH) reception and physical uplink control channel (PUCCH) transmission or a difference between PDCCH reception and physical uplink shared channel (PUSCH) transmission, and wherein the value of the scheduling offset information is indicated by a number of slots, in units of the reference SCS being 60 kHz.

17. The UE of claim 16, wherein the NTN configuration information further comprises medium access control (MAC) control element (CE) offset information, wherein a value of the MAC CE offset information is applied to a difference between MAC CE reception and MAC CE activation timing, and wherein the value of the MAC CE offset information is indicated by a number of slots, in units of the reference SCS being 60 kHz.

18. The UE of claim 16, wherein the message comprises a system information (SI) message including a system information block (SIB) 19.

19. The UE of claim 16, wherein the NTN configuration information includes information of a validity duration for uplink (UL) synchronization, wherein the information of the validity duration for the UL synchronization indicates one of a plurality of possible values, and wherein at least one of the plurality of possible values has a value greater than 900 seconds.

20. The UE of claim 16, wherein the at least one processor is configured to:

based on identifying that the serving cell of the UE is not associated with the FR2,determine another reference SCS used for FR 1 of NR as 15 kHz to determine values of elements in another NTN configuration information.

* * * * *